(12) United States Patent
Heo et al.

(10) Patent No.: US 10,551,997 B2
(45) Date of Patent: Feb. 4, 2020

(54) MOBILE TERMINAL AND METHOD OF CONTROLLING THE SAME

(71) Applicant: LG ELECTRONICS INC., Seoul (KR)

(72) Inventors: Jeongyun Heo, Seoul (KR); Hyoungjoo Kim, Seoul (KR); Jungeun Shin, Seoul (KR); Sohoon Yi, Seoul (KR); Soohyun Lee, Seoul (KR); Moonkyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 15/484,307

(22) Filed: Apr. 11, 2017

(65) Prior Publication Data

US 2017/0249074 A1 Aug. 31, 2017

Related U.S. Application Data

(63) Continuation of application No. 14/177,629, filed on Feb. 11, 2014, now Pat. No. 9,652,116, which is a (Continued)

(30) Foreign Application Priority Data

Jun. 17, 2010 (KR) .......................... 10-2010-0057384
Jul. 5, 2010 (KR) .......................... 10-2010-0064191

(51) Int. Cl.
*G06F 3/14* (2006.01)
*G06F 3/0481* (2013.01)
(Continued)

(52) U.S. Cl.
CPC ........ *G06F 3/04817* (2013.01); *G06F 3/0481* (2013.01); *G06F 3/0482* (2013.01); *G06F 3/0488* (2013.01); *G06F 3/04842* (2013.01)

(58) Field of Classification Search
CPC ......................................................... G06F 3/14
(Continued)

(56) References Cited

U.S. PATENT DOCUMENTS

2006/0112354 A1 5/2006 Park et al.
2007/0011258 A1* 1/2007 Khoo .................... G06F 3/0482
709/206

(Continued)

FOREIGN PATENT DOCUMENTS

CN 101478600 7/2009
CN 101727288 6/2010
(Continued)

OTHER PUBLICATIONS

IPod touch User Guide dated 2008 pp. 14-18 (English & Chinese versions).
(Continued)

*Primary Examiner* — Ruay Ho
(74) *Attorney, Agent, or Firm* — KED & Associates LLP

(57) ABSTRACT

A mobile terminal and a method of controlling a mobile terminal may be provided. The mobile terminal may include a display to display one of a plurality of wallpapers including at least one icon; and a controller to display at least two of the plurality of wallpapers and a plurality of preview screens corresponding to the plurality of wallpapers on the display upon reception of an input of moving at least one icon, moving of the at least one icon being displayed on the displayed wallpapers and preview screens. The mobile terminal can display a movement of icon being displayed on the displayed wallpapers and preview screens. Accordingly, a user may intuitively recognize a location of icon and effectively move a location of icon.

27 Claims, 42 Drawing Sheets

Related U.S. Application Data continuation of application No. 13/080,033, filed on Apr. 5, 2011, now Pat. No. 8,661,369.

(51) Int. Cl.
*G06F 3/0484* (2013.01)
*G06F 3/0488* (2013.01)
*G06F 3/0482* (2013.01)

(58) Field of Classification Search
USPC ........ 715/763, 769, 864, 762, 768; 345/173; 709/206; 358/474
See application file for complete search history.

(56) References Cited

U.S. PATENT DOCUMENTS

| | | | |
|---|---|---|---|
| 2007/0094596 A1 | 4/2007 | Nielsen et al. | |
| 2007/0101297 A1 | 5/2007 | Forstall et al. | |
| 2007/0150810 A1 | 6/2007 | Katz et al. | |
| 2007/0157089 A1 | 7/2007 | Van Os et al. | |
| 2009/0054092 A1 | 2/2009 | Stonefield | |
| 2009/0083655 A1 | 3/2009 | Beharie et al. | |
| 2009/0103144 A1* | 4/2009 | Kim | G06F 3/14 358/474 |
| 2009/0178008 A1 | 7/2009 | Herz et al. | |
| 2009/0259958 A1 | 10/2009 | Ban | |
| 2010/0146430 A1 | 6/2010 | Karimaki | |
| 2010/0262928 A1* | 10/2010 | Abbott | G06F 3/04817 715/769 |
| 2011/0035688 A1* | 2/2011 | Kinoshita | G06F 3/0481 715/763 |
| 2011/0119610 A1* | 5/2011 | Hackborn | G06F 3/0481 715/768 |
| 2011/0156879 A1 | 6/2011 | Matsushita et al. | |
| 2012/0098867 A1 | 4/2012 | Zheng | |
| 2015/0205498 A1* | 7/2015 | Levi | G06F 3/04842 715/763 |

FOREIGN PATENT DOCUMENTS

| | | |
|---|---|---|
| CN | 101739194 | 6/2010 |
| EP | 2 433 210 | 3/2012 |
| KR | 10-2009-0029855 | 3/2009 |
| WO | WO 2004/092896 | 10/2004 |
| WO | WO 2010/134718 | 11/2010 |

OTHER PUBLICATIONS

Chinese Office Action dated Nov. 9, 2012 for Application 20111016188.1 and English language translation.
U.S. Office Action dated Apr. 18, 2013 issued in U.S. Appl. No. 13/080,033.
European Search Report dated Oct. 29, 2013 issued in Application No. 11 00 4634.
U.S. Office Action dated Dec. 17, 2015 issued in U.S. Appl. No. 14/177,629.
U.S. Office Action dated May 26, 2016 issued in U.S. Appl. No. 14/177,629.
Korean Office Action for Application 10-2010-0064191 dated Jun. 8, 2016 (full Korean text).
European Office Action issued in application 11004634.9 dated Mar. 29, 2018.
Extended European Search Report dated Oct. 14, 2019 issued in Application 19185131.0.
"Moving Applications between Virtual Desktops based on Tab Rotation;" IP.com Journal, IP.com Inc., West Henrietta, NY, Mar. 19, 2008) XP013124287, ISSN: 1533-001.

* cited by examiner (a)    (b)

(a)

(b)

(c)

MOBILE TERMINAL AND METHOD OF CONTROLLING THE SAME

CROSS-REFERENCE TO RELATED APPLICATIONS

This application is a Continuation application of U.S. patent application Ser. No. 14/177,629, filed Feb. 11, 2014, which is a Continuation application of U.S. patent application Ser. No. 13/080,033, filed Apr. 5, 2011, which claims priority under 35 U.S.C. § 119 to Korean Application No. 10-2010-0057384, filed Jun. 17, 2010, and No. 10-2010-0064191, filed Jul. 5, 2010, whose entire disclosures are hereby incorporated by reference.

BACKGROUND

1. Field

Embodiments may relate to a mobile terminal and a control method thereof for displaying reduced wallpapers on a display such that a user can intuitively select a wallpaper where an icon to be added may be located.

2. Background

Functions of terminals (such as personal computers, laptop computers, cellular phones and the like) may be diversified, and the terminals may be constructed in the form of a multimedia player having multiple functions of capturing pictures or moving images, playing music, moving image files and games and/or receiving broadcasting programs.

Terminals may include mobile terminals and stationary terminals. The mobile terminals may be classified into handheld terminals and vehicle mount terminals based on whether users can personally carry the terminals.

To support and enhance functions of a terminal, a structural part and/or a software part of the terminal may be improved.

Terminals may include mobile terminals to provide more complex and various functions.

BRIEF DESCRIPTION OF THE DRAWINGS

Arrangements and embodiments may be described in detail with reference to the following drawings in which like reference numerals refer to like elements and wherein.

DETAILED DESCRIPTION

An embodiment may provide a mobile terminal and a control method thereof for displaying reduced wallpapers on a display such that a user may intuitively select a wallpaper where an icon to be added may be located.

Embodiments may now be described more fully with reference to accompanying drawings, in which exemplary embodiments may be shown. Embodiments may be embodied in many different forms and should not be construed as being limited to embodiments as set forth herein; rather embodiments may be provided so this disclosure may be thorough and complete, and may fully convey a concept of this document to those skilled in the art.

A mobile terminal may be described below in more detail with reference to the accompanying drawings. In the following description, suffixes "module" and "unit" may be provided to components of the mobile terminal in consideration of only facilitation of description and may not have meanings or functions that discriminate from each other.

A mobile terminal may include a cellular phone, a smart phone, a laptop computer, a digital broadcasting terminal, personal digital assistants (PDA), a portable multimedia player (PMP), a navigation system and/or etc.

Figure 1:
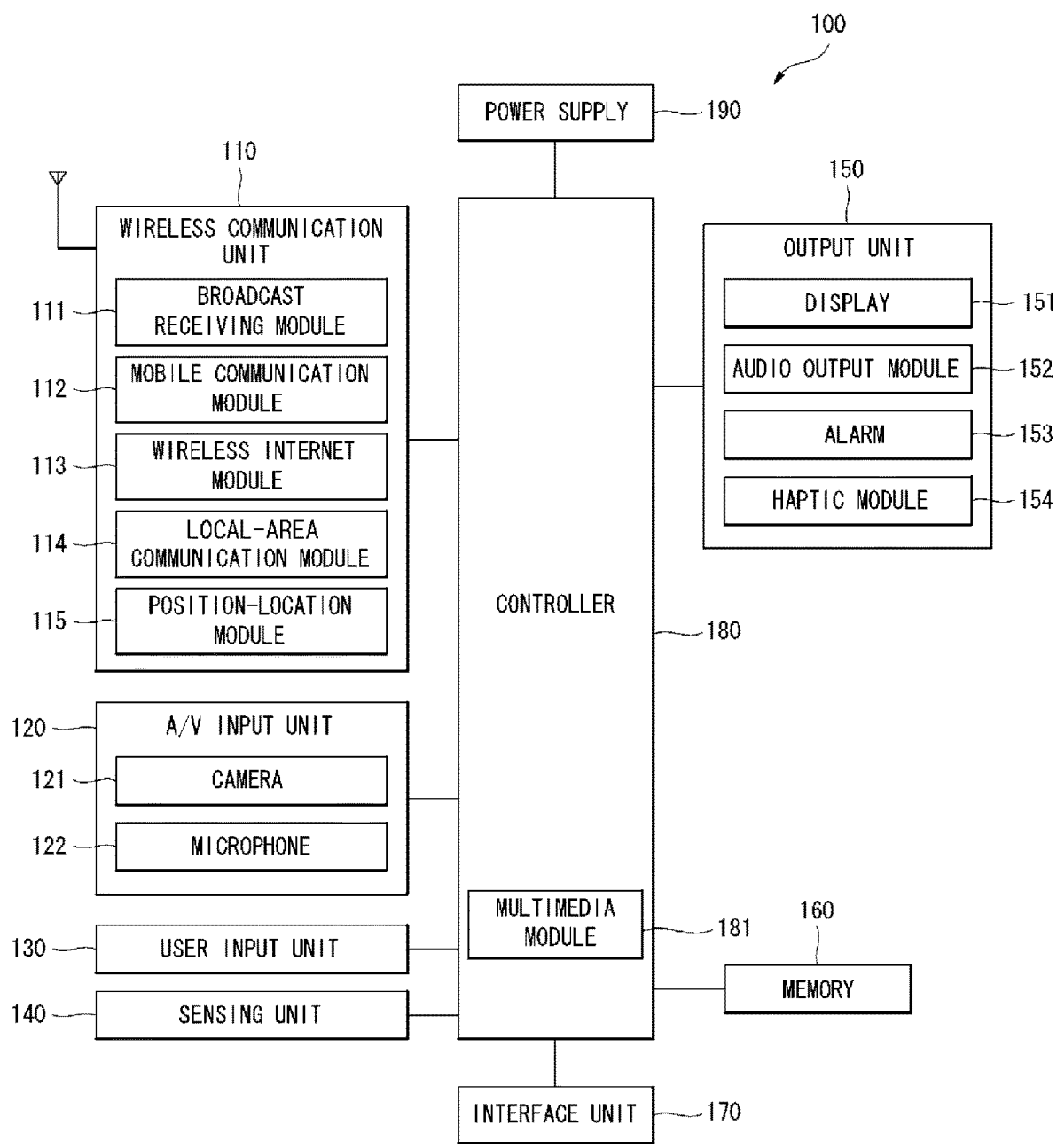
FIG. 1 is a block diagram of a mobile terminal according to an embodiment.

FIG. 1 is a block diagram of a mobile terminal according to an embodiment. Other embodiments, configurations and arrangements may also be provided. As shown, FIG. 1 shows that a mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts, and a number of components included in the mobile terminal 100 may vary. Components of the mobile terminal 100 may now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114 (or short-range communication module), and a position-location information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and/or so on may be used as a wireless Internet technique.

The local area communication module 114 may correspond to a module for local area communication. Further, Bluetooth®, radio frequency identification (RFID), infrared data association (IrDA), ultra wideband (UWB) and/or ZigBee® may be used as a local area communication technique.

The position-location information module 115 may confirm or obtain a position of the mobile terminal 100. The position-location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the position-location information module 115. The GPS module 115 may calculate information on distances between one point or object and at least three satellites and information on a time when a distance information is measured and apply trigonometry to the obtained distance information to obtain three-dimensional position information on the point or object according to latitude, longitude and altitude at a predetermined time.

A method of calculating position and time information using three satellites and correcting a calculated position and time information using another satellite may also be used. Additionally, the GPS module 115 may continuously calculate the current position in real time and calculate velocity information using location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151 (or display module), an audio output module 152, an alarm 153 (or alarm module) and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

Additionally, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind a body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, and/or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field based on the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, and/or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user may feel. One example of the haptic effects is vibration. Intensity and/or pattern of vibration generated by the haptic module 154 may also be controlled. For example, different vibrations may be combined and output and/or may be sequentially output.

The haptic module 154 may generate a variety of haptic effects including an effect of stimulus based on an arrangement of pins vertically moving against a contact skin surface, an effect of stimulus according to a jet force or sucking force of air through a jet hole or a sucking hole, an effect of stimulus of rubbing the skin, an effect of stimulus based on contact of an electrode, an effect of stimulus using an electrostatic force, and an effect based on a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk.

The mobile terminal 100 may also operate in relation to a web storage performing a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 (as shown in FIG. 1) or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
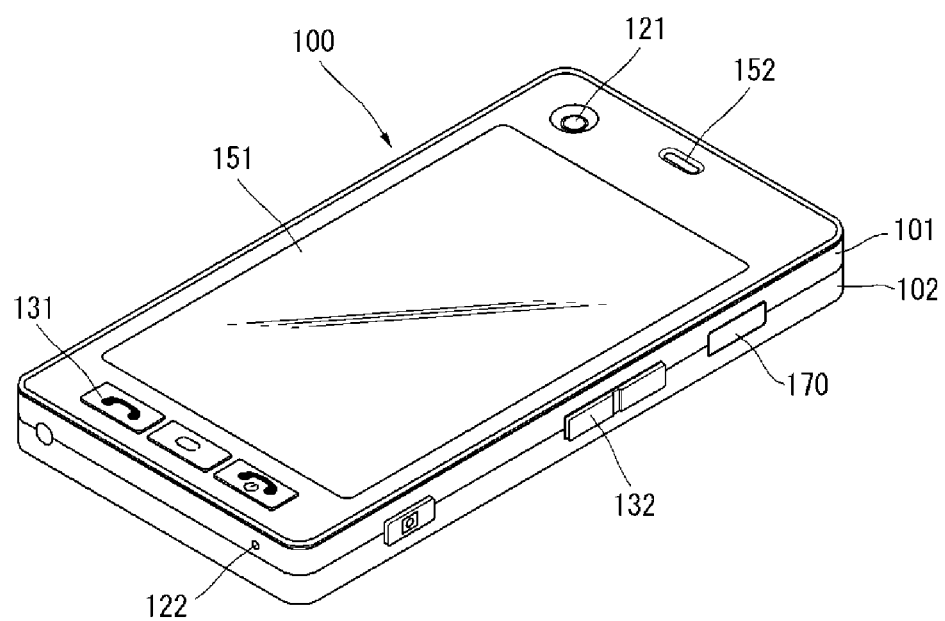
FIG. 2A is a front perspective view of a mobile terminal according to an embodiment.

FIG. 2A is a front perspective view of a mobile terminal (or a handheld terminal) 100 according to an embodiment.

The mobile terminal 100 may have a bar type terminal body. However, embodiments are not limited to a bar type terminal and may be applied to terminals of various types including a slide type, a folder type, a swing type and swivel type terminals having at least two bodies that are relatively movably combined.

The terminal body may include a case (a casing, a housing, a cover, etc.) forming an exterior of the mobile terminal 100. In the present embodiment, the case may include a front case 101 and a rear case 102. Various electronic components may be arranged in a space formed between the front case 101 and the rear case 102. At least one middle case may be additionally provided between the front case 101 and the rear case 102.

The cases may be formed of plastics through injection molding or made of a metal material, such as stainless steel (STS) or titanium (Ti).

The display 151, the audio output unit 152, the camera 121, the user input unit 130/131 and 132, the microphone 122 and the interface 170 may be arranged in the terminal body, and more specifically in the front case 101.

The display 151 may occupy most of the main face of the front case 101. The audio output unit 152 and the camera 121 may be arranged in a region in proximity to a first end of the display 151 and the user input unit 131 and the microphone 122 are provided in a region in proximity to the second end of the display 151. The user input unit 132 and the interface 170 may be arranged on sides of the front case 101 and the rear case 102.

The user input unit 130 may operate to receive commands for controlling an operation of the mobile terminal 100 and may include a plurality of operating units 131 and 132. The operating units 131 and 132 may be referred to as manipulating portions and employ any tactile manner in which a user operates the operating units 131 and 132 while having a tactile feeling.

The first and second operating units 131 and 132 may receive various inputs. For example, the first operating unit 131 may receive commands such as start, end and scroll, and the second operating unit 132 may receive commands such as control of the volume of sound output from the audio output unit 152 or conversion of the display 151 to a touch recognition mode.

Figure 2B:
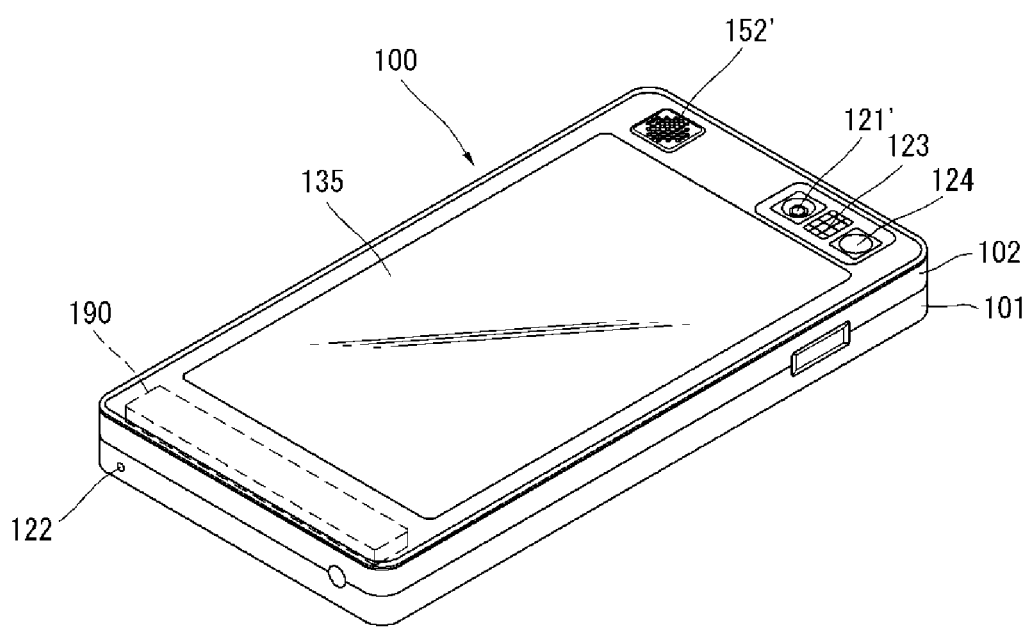
FIG. 2B is a rear perspective view of a mobile terminal according to an embodiment.

FIG. 2B is a rear perspective view of the mobile terminal shown in FIG. 2A according to an embodiment.

Referring to FIG. 2A, a camera 121' may be additionally attached to the rear side of the terminal body (i.e., the rear case 102). The camera 121' may have a photographing direction opposite to the camera 121 shown in FIG. 2A and may have pixels different from those of the camera 121 shown in FIG. 2A.

For example, the camera 121 may have low pixels such that the camera 121 may capture an image of a face of a user and transmit the image to a receiving part in case of video telephony while the camera 121' has high pixels because the camera 121' may capture an image of a general object and may not immediately transmit the image. The cameras 121 and 121' can be attached to the terminal body such that the cameras 121, 121' can be rotated or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 shown in FIG. 2A and may be used for a speaker phone mode when the mobile terminal 100 is used for a telephone call.

A broadcasting signal receiving antenna may be additionally provided (or attached) to the side of the terminal body in addition to an antenna for telephone calls. The antenna constructing a part of the broadcasting receiving module 111 (shown in FIG. 1) can be set in the terminal body such that the antenna can be pulled out of the terminal body.

The power supply 190 for providing power to the handheld terminal 100 may be set in the terminal body. The power supply 190 may be included in the terminal body or may be detachably attached to the terminal body.

A touch pad 135 for sensing touch may be additionally attached to the rear case 102. The touch pad 135 may be of a light transmission type as the display 151. In this example, if the display 151 outputs visual information through both sides thereof, the visual information may be recognized through the touch pad 135. The information output through both sides of the display 151 may be controlled by the touch pad 135. Otherwise, a display may be additionally attached to the touch pad 135 such that a touch screen can be arranged even in the rear case 102.

The touch pad 135 may operate in connection with the display 151 of the front case 101. The touch pad 135 can be located in parallel with the display 151 behind the display 151. The touch panel 135 can be identical to or smaller than the display 151 in size.

Figure 2C:
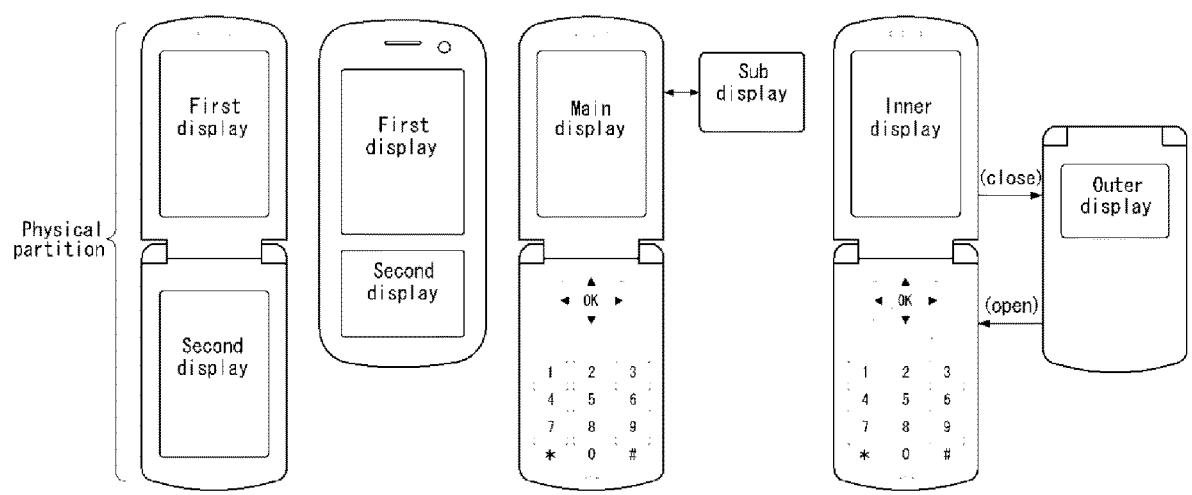
FIGS. 2C and 2D illustrate forms of a mobile terminal and display screens according to various embodiments.
Figure 2D:
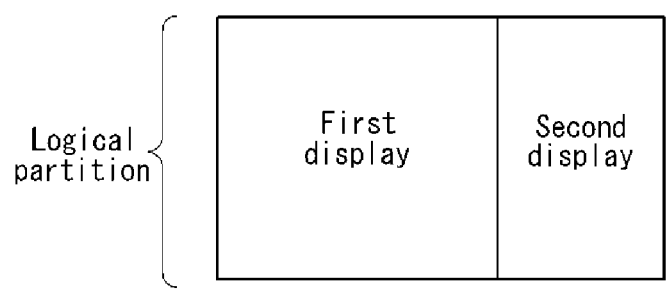

FIGS. 2C and 2D illustrate the mobile terminal 100 and the display 151 based on various embodiments. Other embodiments may also be provided.

As shown in FIG. 2C, the display 151 may include a first display and a second display that are physically separated from each other. In a folder type or slide type mobile terminal having two bodies connected through a hinge or a slide, the first display (or main display) may be formed on an inner face or an outer face of one of the bodies and the second display (or sub display) may be formed on the inner face or the outer face of the other body. The sub-display may be separated from the mobile terminal and may be detachably combined with the mobile terminal body through an interface to display data from the mobile terminal 100.

The display 151 may include first and second displays that are logically separated from each other in a display panel, as shown in FIG. 2D.

Figure 3:
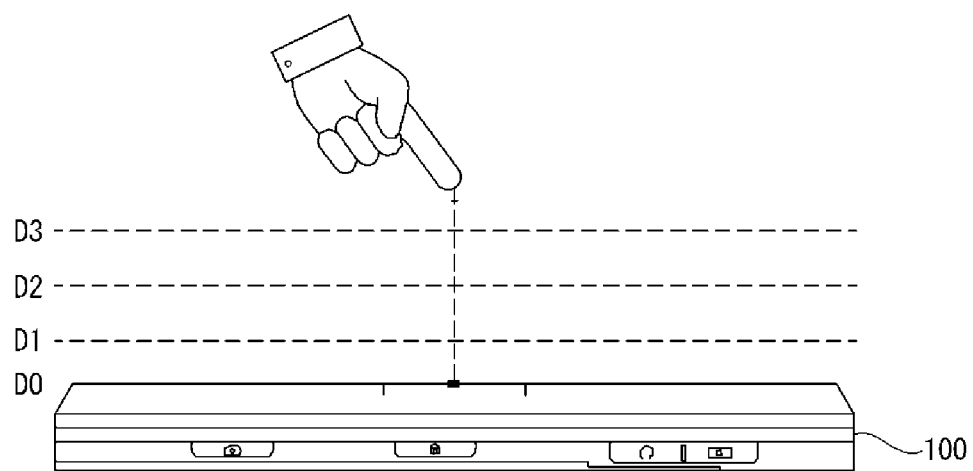
FIG. 3 illustrates a proximity depth of a proximity sensor.

FIG. 3 illustrates a proximity depth of a proximity sensor.

As shown in FIG. 3, when a pointer such as a user's finger approaches the touch screen, the proximity sensor located inside or near the touch screen senses the approach and outputs a proximity signal.

The proximity sensor may be constructed such that it outputs a proximity signal based on a distance between the pointer approaching the touch screen and the touch screen (referred to as a proximity depth).

The distance in which the proximity signal is output when the pointer approaches the touch screen may be referred to as a detection distance. The proximity depth may be known by using a plurality of proximity sensors having different detection distances and comparing proximity signals respectively output from the proximity sensors.

FIG. 3 shows a section of the touch screen in which proximity sensors capable of sensing three proximity depths are provided. Proximity sensors capable of sensing less than three or more than four proximity depths may be provided in the touch screen.

More specifically, when a pointer completely comes into contact with the touch screen (D0), it may be recognized as a contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as a cancellation of a proximity touch.

Accordingly, the controller 180 may recognize the proximity touch as various input signals based on the proximity distance and proximity position of the pointer with respect to the touch screen, and the controller 180 may perform various operation controls based on the input signals.

Figure 4:
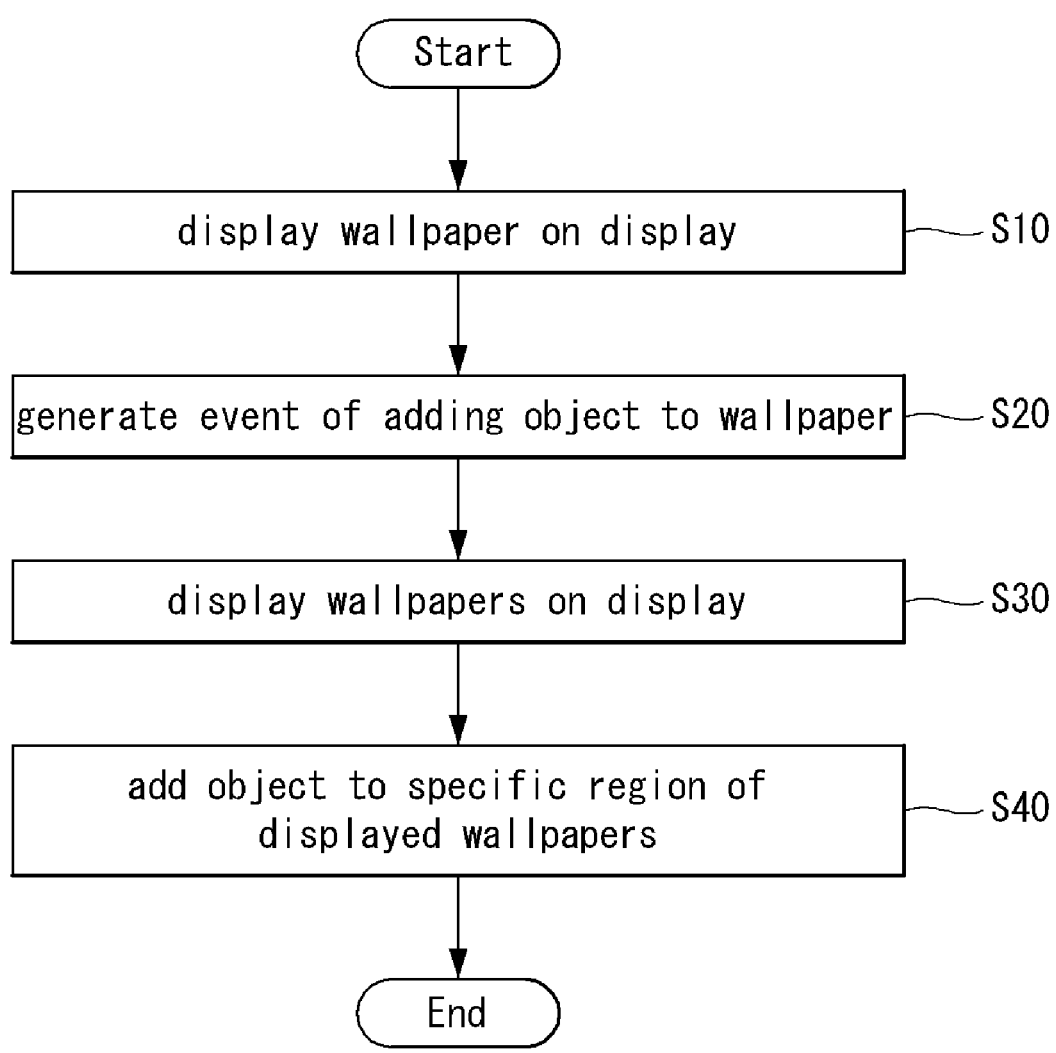
FIG. 4 is a flowchart of an operation of a mobile terminal (shown in FIG. 1) according to an embodiment.
Figure 5:
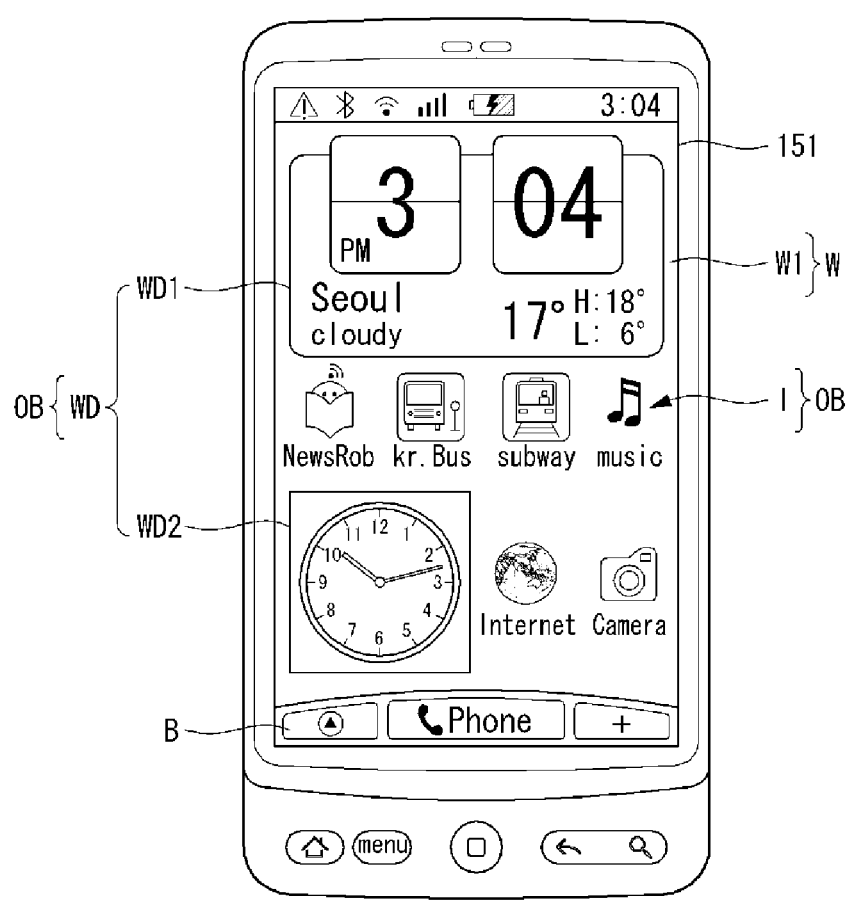
FIG. 5 is a view for explaining an operation of a mobile terminal to display a wallpaper on a display.

FIG. 4 is a flowchart of an operation of the mobile terminal 100 according to an embodiment. FIG. 5 is a view for explaining an operation of the mobile terminal 100 to display a wallpaper on the display 151, as shown in FIG. 4. Other embodiments may also be provided.

Referring to FIGS. 4 and 5, the controller 180 may display a wallpaper W on the display 151 in operation S10.

The wallpaper W may be an image displayed on the display 151 of the mobile terminal 100 while an application to be displayed on an overall area or part of the display 151 is not executed, although the display 151 is activated. The display 151 may be in an inactivated state and/or in an activated state. The inactivated state may correspond to a state in which the display 151 is turned off while the mobile terminal 100 is turned on. When a user's input or a control signal of the controller 180 is applied to the mobile terminal 100 with the display 151 turned off, the display 151 may enter the activated state. The activated state may correspond to a state in which a specific application is not executed while the display 151 is activated or an execution state of the specific application is not displayed on the display 151 although the specific application is executed. In this example, the wallpaper W may be displayed on the display 151.

The wallpaper W may display objects OB such as widget icons WD and icons I. The wallpaper W may display the widget icons WD and the icons I based on whether or not information may be dynamically displayed through icons. For example, a first widget icon WD1 may correspond to time and weather widgets. The controller 180 may change the display of the first widget icon WD1 based on a lapse of time and/or based on a weather variation. The icons I may function as media for executing specific applications. For example, if a music icon is selected, a player application capable of playing mp3 may be executed. Additionally, if a subway icon is selected, an application capable of displaying a subway timetable may be executed. The widget icons WD and the icons I may be represented as the objects OB in the following description except additionally marked parts.

Positions and space widths of the objects OB may depend on their attributes. That is, a display form of each object OB may vary based on the attribute thereof. For example, when the user wants to display the first widget icon WD1 having a large size on the wallpaper W, the wallpaper W may be required to have a space capable of accommodating the first widget icon WD1. If the wallpaper W does not have the space, the first widget icon WD1 may not be located on the wallpaper W. In this example, it may be required to delete other objects OB located on the wallpaper W or generate a new wallpaper to create space for displaying the first widget icon WD1.

Multiple wallpapers W may exist. That is, there may be multiple wallpapers W capable of displaying the objects OB. For example, the wallpaper W shown in FIG. 5 may correspond to a first wallpaper W1 and other wallpapers W that are not shown in FIG. 5 may exist. The user may drag or flick the display 151 to the left or to the right to display a wallpaper W on the left or the right of the first wallpaper W1 on the display 151.

After the wallpaper W is displayed on the display 151, an event of adding an object OB to the wallpaper W may be performed in operation S20. This may also be referred to as an event of adding an object.

Figure 6:
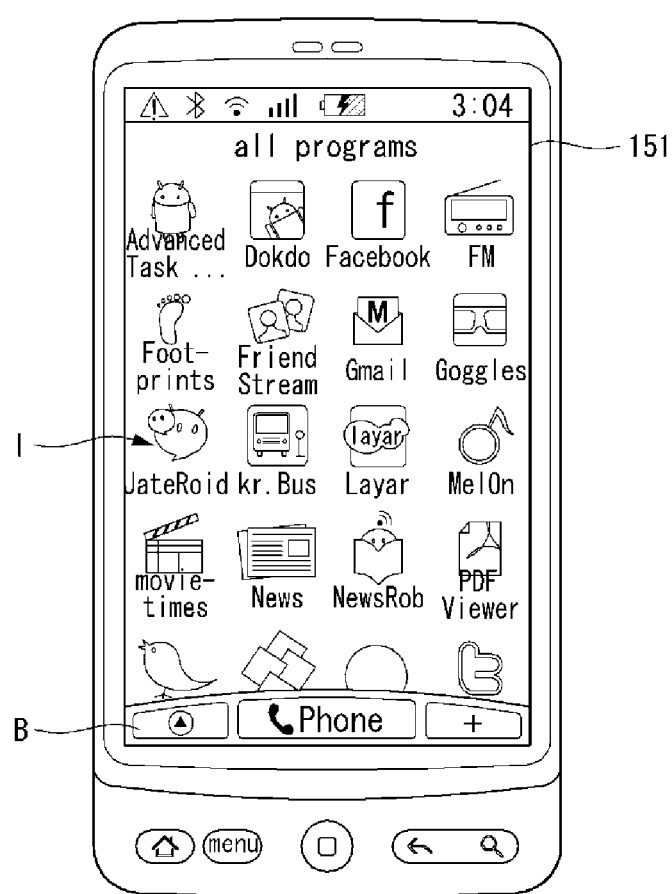
FIG. 6 is a view for explaining an operation of a mobile terminal to generate an event of adding an icon to a wallpaper.

The adding of the object OB to the wallpaper W may be performed or initiated by a user's input or a control operation of the controller 180. For example, the user may touch a virtual button B displayed on the display 151 to add the object OB to the wallpaper W. As shown in FIG. 6, when the user touches the virtual button B displayed on the display 151, the controller 180 may display icons I that can be added to the wallpaper W on the display 151. The user can touch one of the displayed icons I to add the touched icon I to the wallpaper W. The adding of the object OB to the wallpaper W may be explained in more detail later.

When an event of adding of the object OB to the wallpaper W is performed, multiple wallpapers W may be displayed on the display 151 in operation S30.

When an event of adding of the object OB to the wallpaper W is performed, the controller 180 may determine whether or not the wallpaper W currently displayed on the display 151 has a vacancy. If the currently displayed wallpaper W does not have the vacancy, multiple wallpapers W may be displayed on the display 151. For example, the first wallpaper W1 currently displayed on the display 151 may not have a vacancy for displaying the added object OB because the first wallpaper W1 includes the widget icons WD and the icons I, as shown in FIG. 5. In this example, the controller 180 may display another wallpaper W capable of displaying the added object OB on the display 151 to show the wallpaper W to the user. To secure a space for displaying the other wallpaper W on the display 151, the controller 180 may reduce an area of the first wallpaper W1 currently displayed on the display 151. The controller 180 may display the other wallpaper W in the space secured by reducing the area of the first wallpaper W1.

When the multiple wallpapers W are displayed on the display 151, the added object OB may be located (or provided) in a specific position on the multiple wallpapers W in operation S40.

At least one of the displayed wallpapers W may have a vacancy such that the wallpaper is capable of displaying the added object OB. The user may add the object OB to the wallpaper W having the vacancy by using a touch operation. If the displayed wallpapers W do not have a vacancy capable of displaying the added object Oft the user may touch (or touch and drag) the display 151 to the left or to the right to search for a wallpaper W having a vacancy such that the wallpaper is capable of displaying the added object OB. As described above, the size and/or the shape of the object OB may depend on its attribute. For example, a specific object may have a size of 16×16 while another object may have a size of 32×32.

Figure 7:
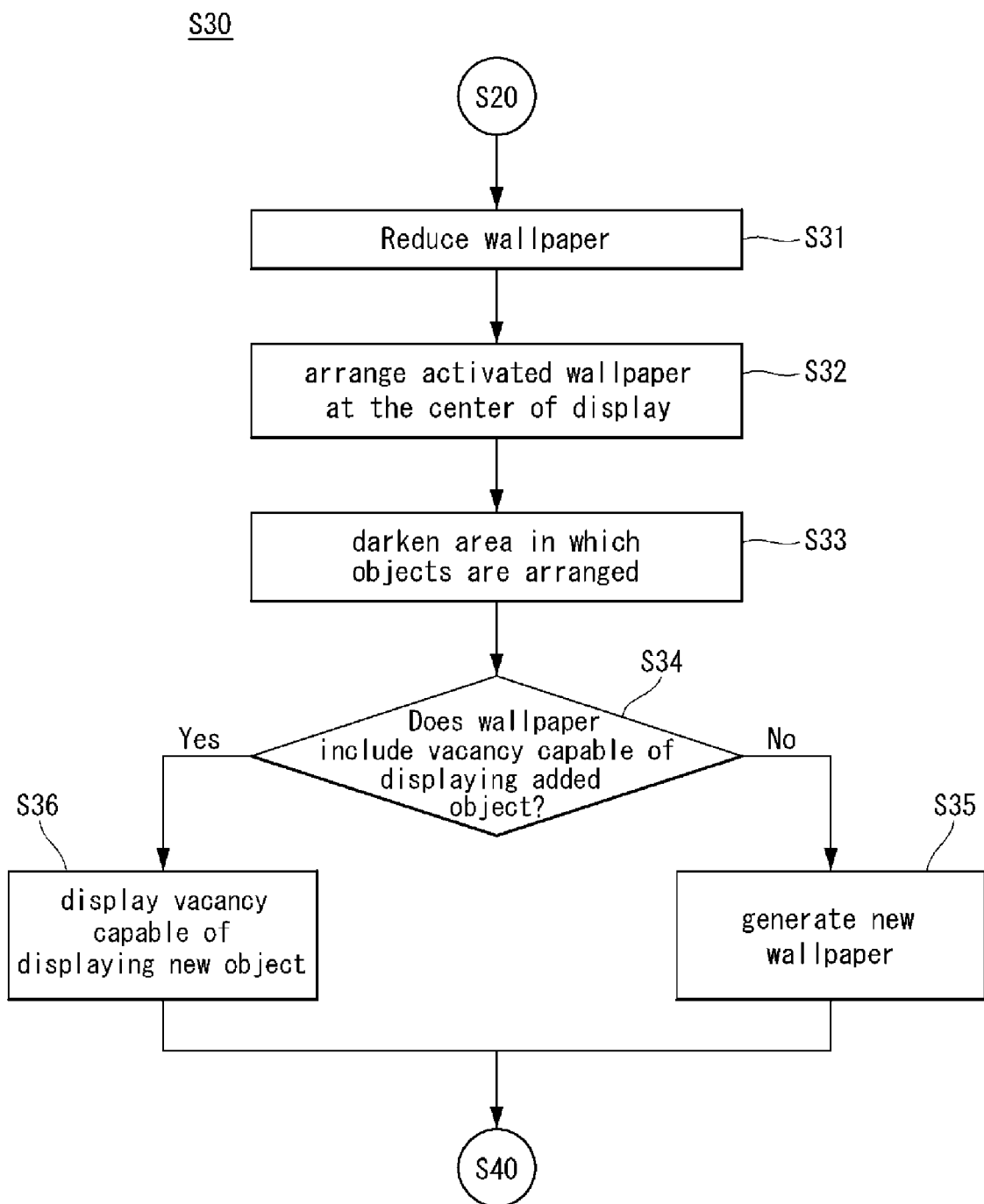
FIG. 7 is a flowchart showing an operation of displaying wallpapers on a display.

FIG. 7 is a flowchart of the operation S30 of displaying multiple wallpapers on the display 151, as shown in FIG. 4.

Figure 8:
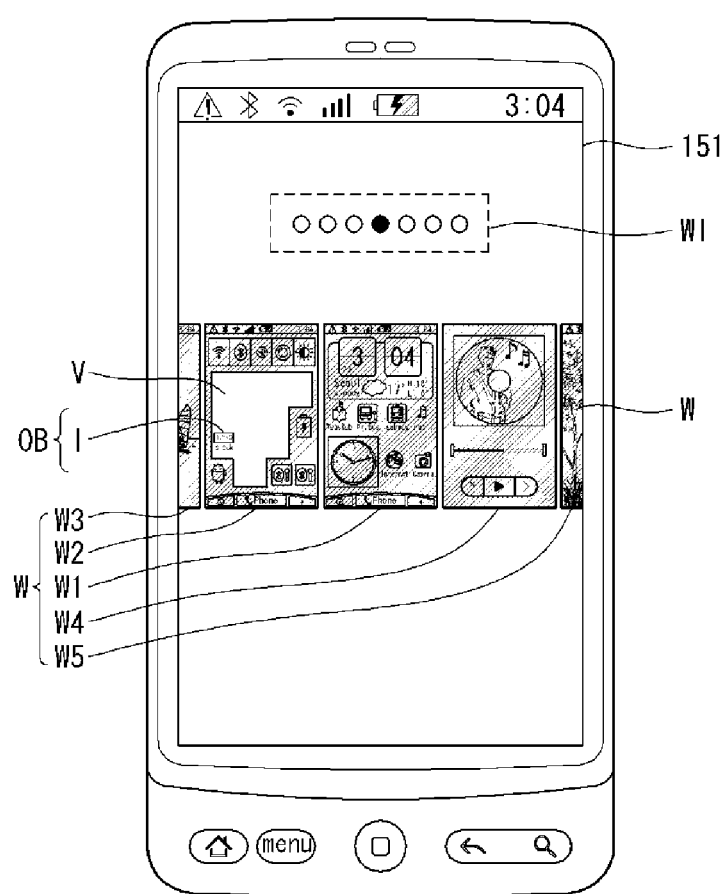
FIG. 8 is a view for explaining an operation of a mobile terminal as shown in FIG. 7.

FIG. 8 is a view for explaining the operation of the mobile terminal 100, as shown in FIG. 7. Other embodiments may also be provided.

As shown in FIGS. 7 and 8, the operation S30 of displaying multiple wallpapers W on the display 151 may include an operation S31 of reducing an area of the currently displayed wallpaper W.

As described above, the controller 180 may display multiple wallpapers W on the display 151 when the currently displayed wallpaper W does not have a vacancy capable of displaying the added object OB. To display the multiple wallpapers W on the display 151, a space for displaying the multiple wallpapers W may have to be secured. The controller 180 may reduce the area of the wallpaper W displayed on the overall area of the display 151 to secure the space for displaying the multiple wallpapers W. For example, when the event of adding the object OB to the wallpaper W is performed while the first wallpaper W1 is displayed on the overall area of the display 151, the controller 180 may reduce the area of the first wallpaper W. Then, the controller 180 may display second, third, fourth and fifth wallpapers W2, W3, W4 and W5 in the space secured by reducing the first wallpaper W1.

When the wallpaper W is reduced, the controller 180 may display wallpaper indicators WI on the display 151. The wallpaper indicators WI may correspond to respective wallpapers W. For example, when the user generates seven wallpapers, seven wallpaper indicators may be displayed on the display 151. However, only five of the seven wallpapers W are displayed on the display 151 (in FIG. 8) due to a restriction on the area of the display 151.

When the currently displayed wallpaper W is reduced, an activated wallpaper W may be located at a center of the display 151 in operation S32.

The activated wallpaper W may correspond to a wallpaper W that was displayed on the display 151 before the currently displayed wallpaper is reduced. The activated wallpaper may be a wallpaper displayed at a center of the display 151 by touching the reduced wallpaper W. For example, the activated wallpaper W may correspond to the first wallpaper W1, as shown in FIG. 8. The wallpaper indicators WI may indicate the currently activated wallpaper W. That is, the wallpaper indicator WI corresponding to the first wallpaper W1 may be indicated differently from the other six wallpaper indicators WI when the first wallpaper W1 is activated, as shown in FIG. 8. The activation may be different from activation when there is a vacancy such that the wallpaper is capable of displaying an object Oft as may be described below. That is, activation in operation S32 may represent that the activated wallpaper W can be displayed on the display 151 when the operation of displaying the wallpaper W on the overall area of the display 151 is performed.

Subsequently, the regions occupied by objects OB may be darkened in operation S33.

Various objects OB in addition to an icon I that the user wants to newly add may be provided on the wallpaper W. Accordingly, a certain wallpaper, such as the first and fourth wallpapers W1 and W4, may not have a vacancy for displaying an added object OB. A certain wallpaper, such as the second wallpaper W2, may have an object OB located thereon. In this example, the new object OB may not be added to the second wallpaper W2. Accordingly, the controller 180 may inactivate regions where objects have been arranged and may make the inactivated regions darker so as to visually represent the inactivated regions.

The controller 180 may determine whether or not the wallpaper W has a vacancy capable of displaying the added object OB in operation S34 and generate a new wallpaper W when the wallpaper W does not have the vacancy in operation S35.

The wallpaper W may not have the vacancy capable of displaying the added object OB. For example, when two wallpapers are currently displayed on the display 151 and objects OB are located over the two wallpapers, the controller 180 may add a new wallpaper for displaying the added object OB.

When the wallpaper W has the vacancy for displaying the added object Oft the vacancy for displaying the added object OB may be displayed in operation S36.

The wallpaper W may have a vacancy in which an object OB may be additionally provided. For example, the second wallpaper W2 may have a vacancy V, as shown in FIG. 8. The controller may display the vacancy V brighter to visually inform the user that the second wallpaper W2 has the vacancy V. The controller 180 may further indicate a boundary line along the outline of the vacancy V.

Figure 9:
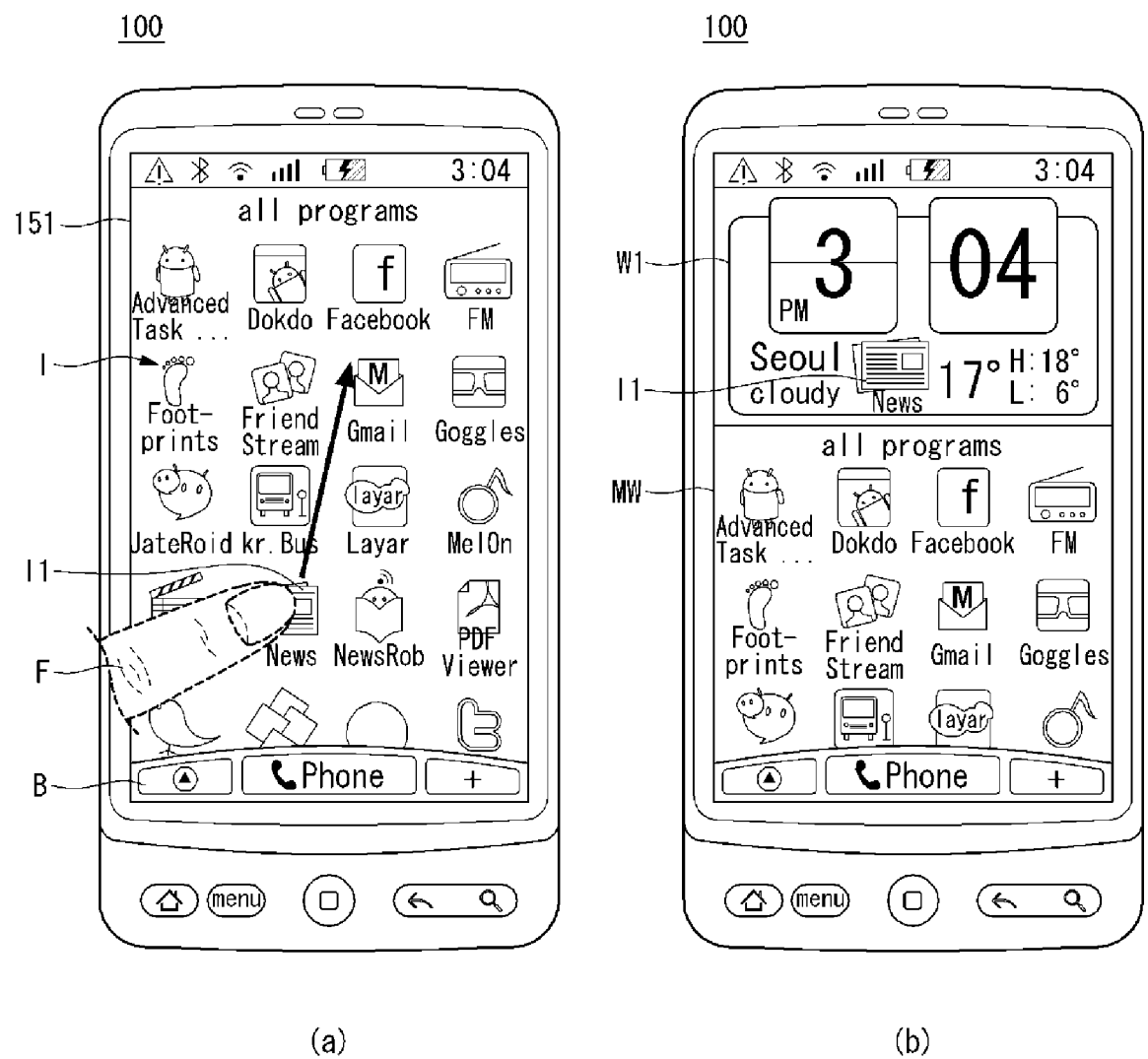
FIGS. 9 and 10 illustrate implementations of an event of adding an object to a wallpaper.
Figure 10:
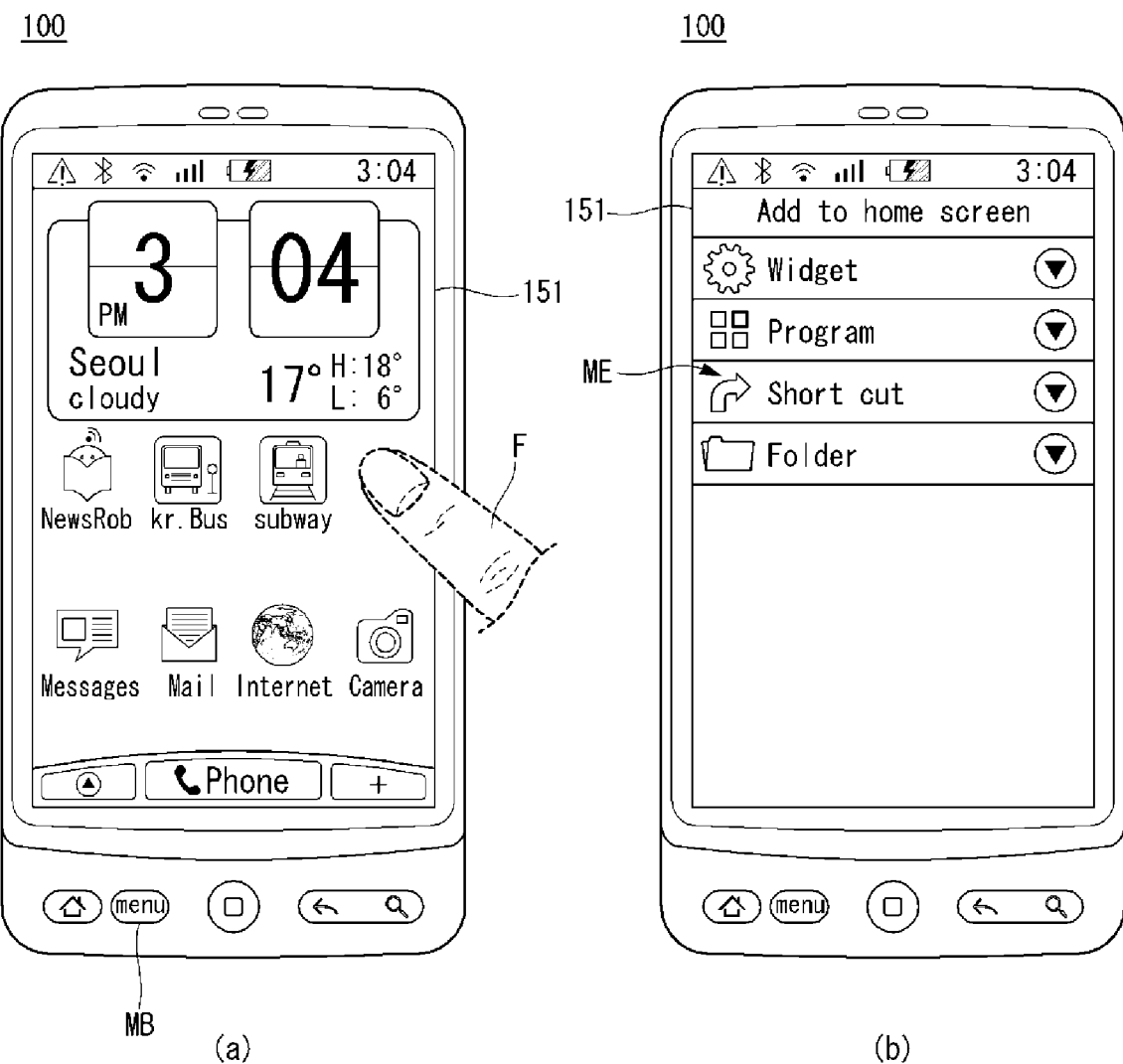

FIGS. 9 and 10 illustrate implementations of adding an object to wallpaper. Other embodiments may also be provided.

Referring to FIGS. 9 and 10, the mobile terminal 100 may add an object OB to the wallpaper W in various manners.

As shown in FIG. 9 (a), when the user touches the virtual button B, icons I that may be added are displayed on the display 151. The user may select a first icon I1 to be added from the displayed icons I by touching the first icon I1 with a finger F (or other pointing device). The user may drag the selected first icon I1 in a specific direction.

As shown in FIG. 9 (b), when the user selects the first icon I1 and drags the selected first icon I1, a first menu screen MW, on which the icons I are displayed, may slide (or be provided) to a bottom of the display 151. The first wallpaper W1 may then be displayed on a space created by sliding (or providing) of the first menu screen MW. Further, the user may continuously touch the first icon I1 to move the first icon I1 from the first menu screen MW to the first wallpaper W1. Although FIG. 9 shows movement of the first icon I1 from the first menu screen MW to the first wallpaper W1, the above touch-and-drag method may be applied to an example that an icon I located on a specific wallpaper is moved to another wallpaper.

As shown in FIG. 10 (a), the user may long touch, with a finger F, a vacancy of the display 151 in which any object OB is not located. Additionally, the user may press a specific button MB (i.e., a menu button).

As shown in FIG. 10 (b), when the user long touches the vacancy of the display 151 or presses the specific button MB, the controller 180 may display a second menu screen ME on the display 151. The user may select a widget icon or an icon from the second menu screen ME or its lower menu to add the selected icon to the wallpaper W.

Figure 11:
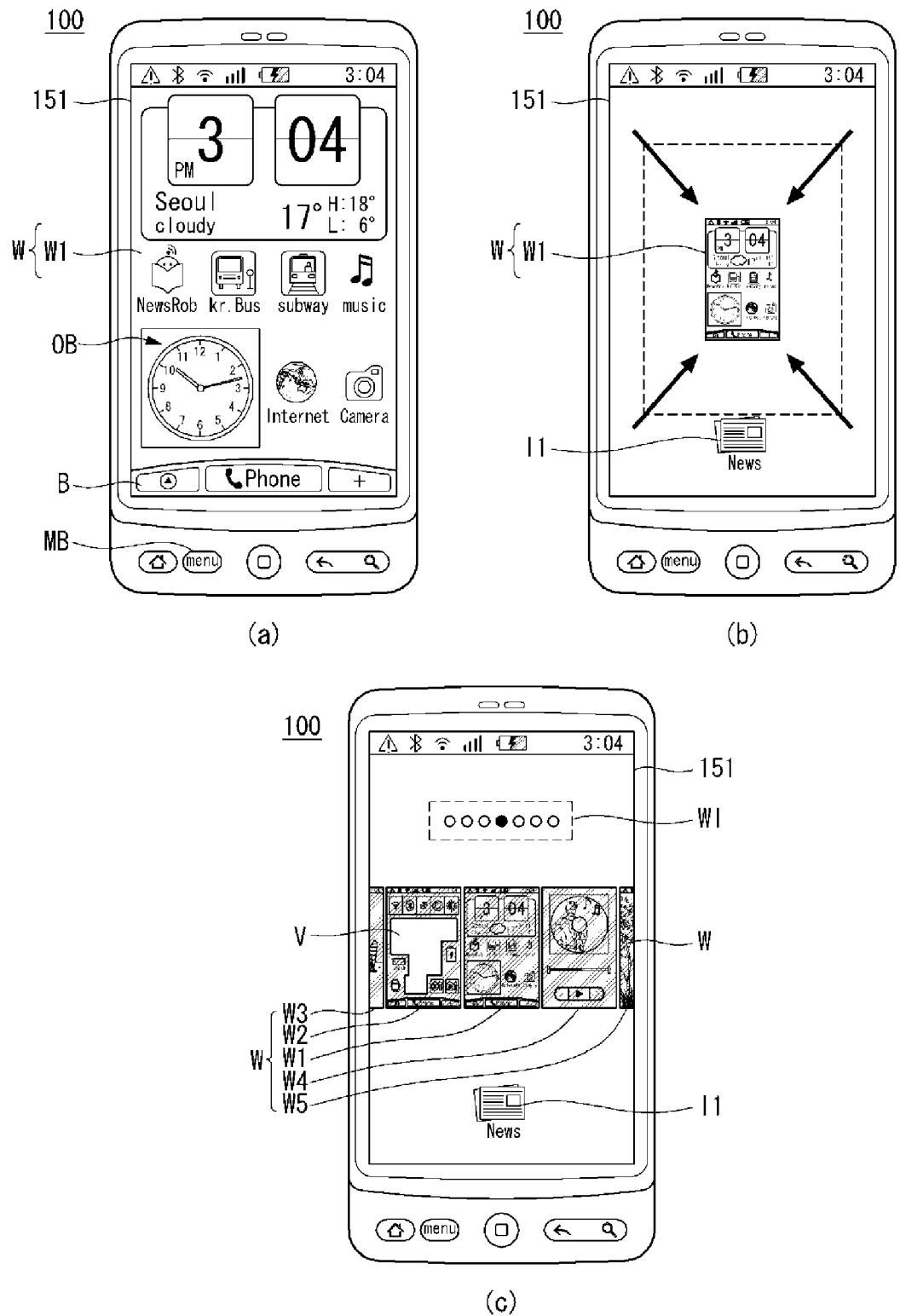
FIGS. 11, 12 and 13 are views for explaining an operation of a mobile terminal.
Figure 12:
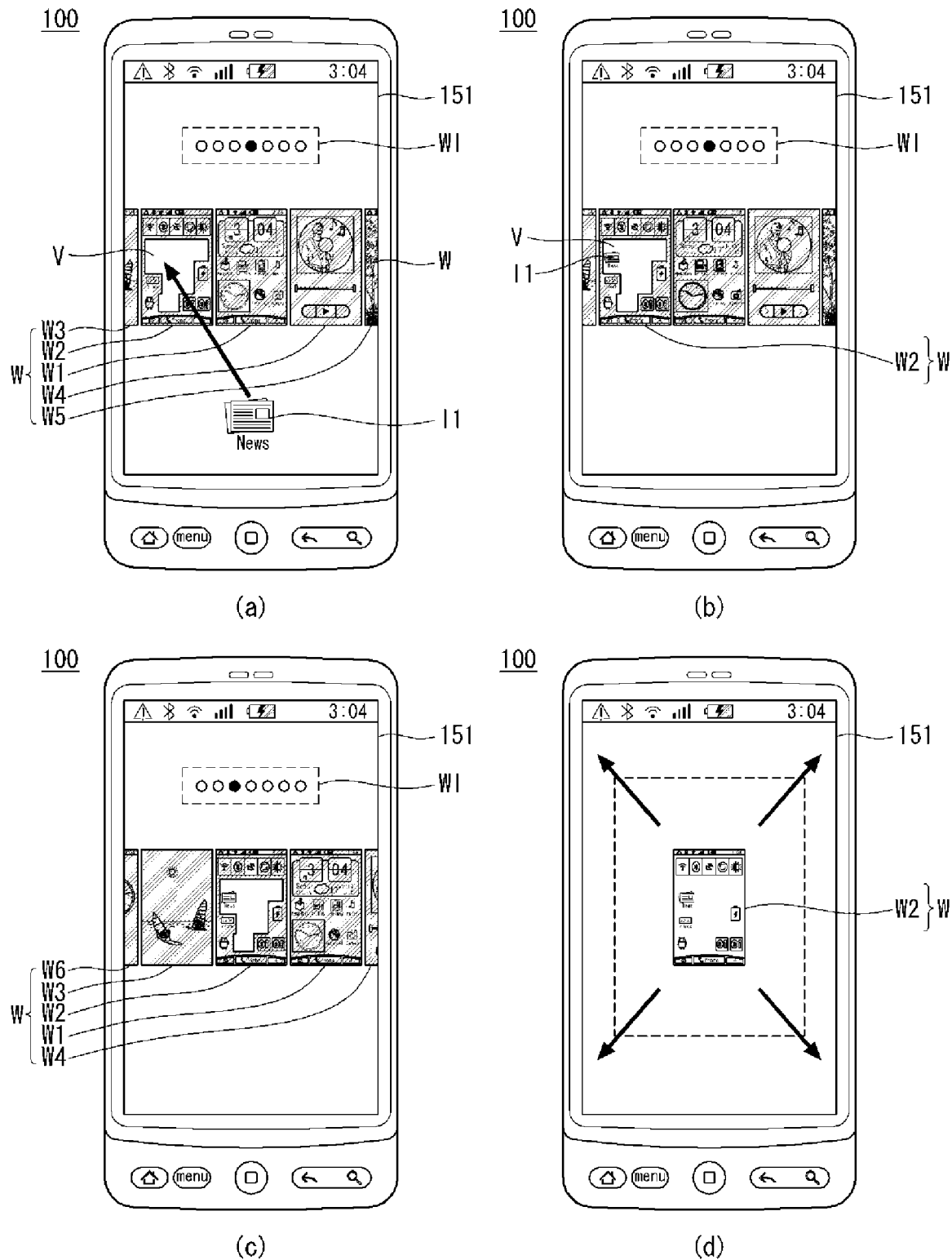
Figure 13:
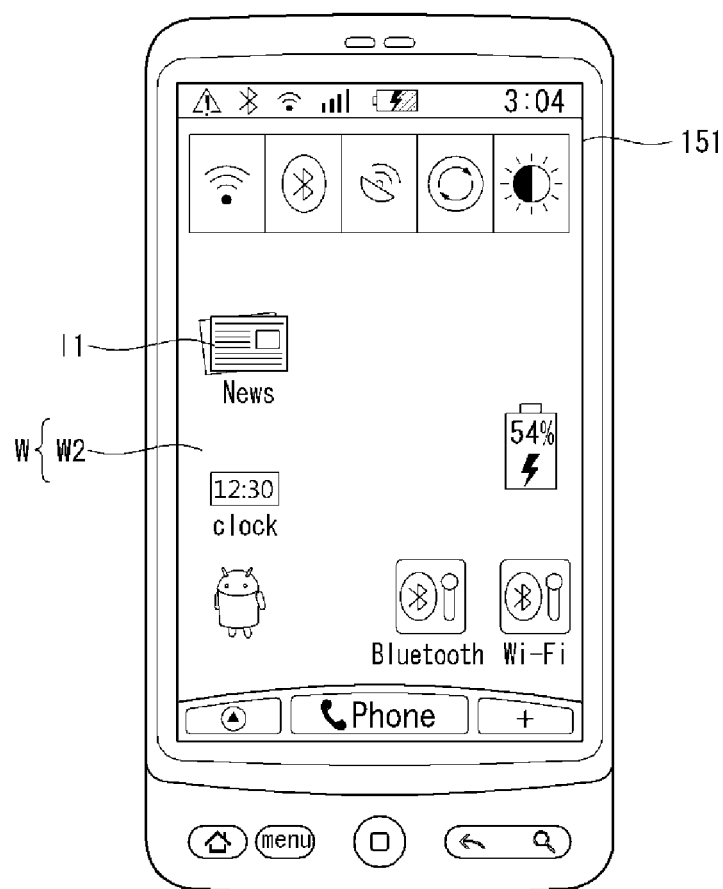

FIGS. 11, 12 and 13 are views for explaining an operation of the mobile terminal 100, as shown in FIG. 4. Other embodiments may also be provided.

Referring to FIGS. 11, 12 and 13, the mobile terminal 100 may display reduced wallpapers W on the display 151 such that the user may intuitively select a wallpaper on which an added icon may be located.

Referring to FIG. 11 (a), the first wallpaper W1 may display various objects OB. The user may perform an event of adding an object. For example, the user may touch the virtual button B and/or press the specific button MB to start the event.

Referring to FIG. 11 (b), when the event is started, a size of the first wallpaper W1 displayed on an overall area of the display 151 may be reduced. The controller 180 may display the first wallpaper W1 as a continuously decreasing object such that the user may be interested in operation of the mobile terminal 100. The display 151 may display the first icon I1 selected by the user.

As shown in FIG. 11 (c), the second, third, fourth and fifth wallpapers W2, W3, W4 and W5 may be displayed in an area obtained by reducing the first wallpaper W1. Further, the wallpaper indicators WI that indicate the currently activated wallpapers W may be displayed at the upper part of the display 151. The controller 180 may display a vacancy V in the displayed wallpaper W, in which the added first icon I1 may be located. That is, the controller 180 may inactivate an area where the first icon I1 may not be located due to objects OB that occupy the area to make the area darker and activate an area where any object OB is not located and thus the first icon I1 may be displayed to make the area brighter.

As shown in FIG. 12 (a), the user may select the first icon I1 and drag the selected first icon I1 to the vacancy V. Then, the first icon I1 is located on the second wallpaper W2, as shown in FIG. 12 (b).

As shown in FIG. 12 (c), the controller 180 may display the second wallpaper W2 including the first icon I1 added by the user at a center of the display 151.

As shown in FIG. 12 (d), the controller 180 may enlarge the second wallpaper W2 including the first icon I1 and display the second wallpaper W2 on the display 151. That is, the second wallpaper W2 may be enlarged and displayed on an overall area of the display 151. The controller 180 may display the second wallpaper W2 as a continuously increasing object such that the user may be interested in operation of the mobile terminal 100.

As shown in FIG. 13, the enlarged second wallpaper W2 including the first icon I1 is displayed on an overall area of the display 151.

FIGS. 14 through 18 are views for explaining an operation of the mobile terminal 100 to add an icon, as shown in FIG. 4.

The mobile terminal 100 may add an icon I to the wallpaper W in various manners.

Figure 14:
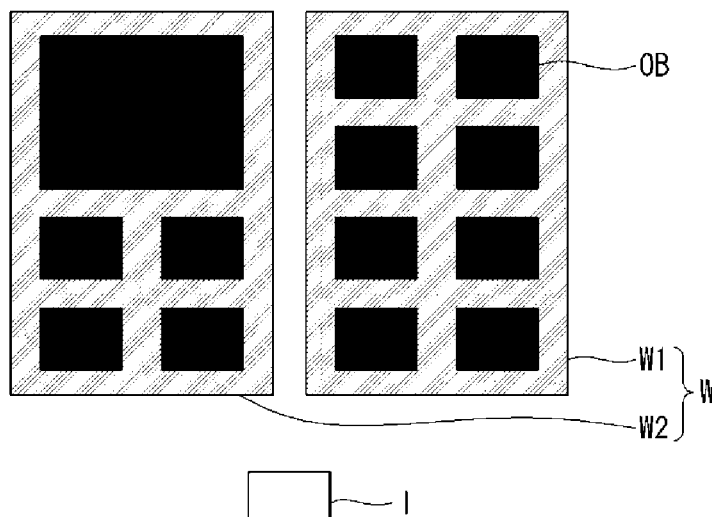
FIGS. 14 through 18 are views for explaining an operation of a mobile terminal to add an icon.
Figure 14:
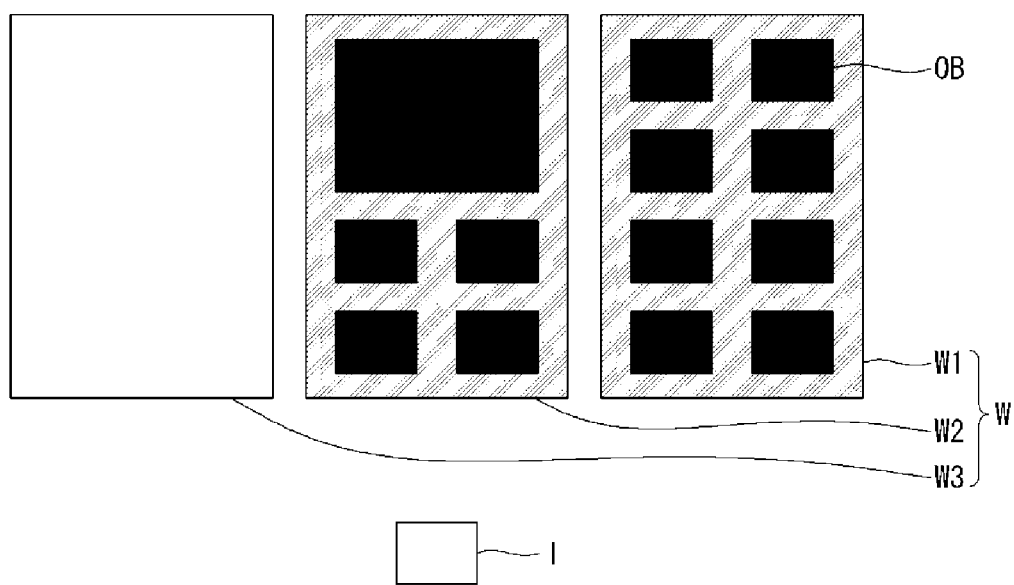

As shown in FIG. 14 (a), the display 151 may display the first wallpaper W1 and the second wallpaper W2. Since two wallpaper indicators WI are displayed on the display 151, a total number of wallpapers equals two (i.e., the first and second wallpapers W1 and W2). An icon I to be added may be displayed in a region of the display 151 that does not correspond to the first wallpaper W1 and the second wallpaper W2.

As shown in FIG. 14 (b), the controller 180 may display a third wallpaper W3 as a new wallpaper. The currently displayed first wallpaper W1 and the second wallpaper W2 include objects Oft and thus the first wallpaper W1 and the second wallpaper W2 do not have a vacancy for displaying the icon I selected by the user. Accordingly, the controller 180 may generate the third wallpaper W3 to additionally display the icon I. The third wallpaper W3 may be a newly generated, and thus the third wallpaper W3 may not include an object OB. Accordingly, the user may add the icon I, a new object Oft to the third wallpaper W3.

Figure 15:
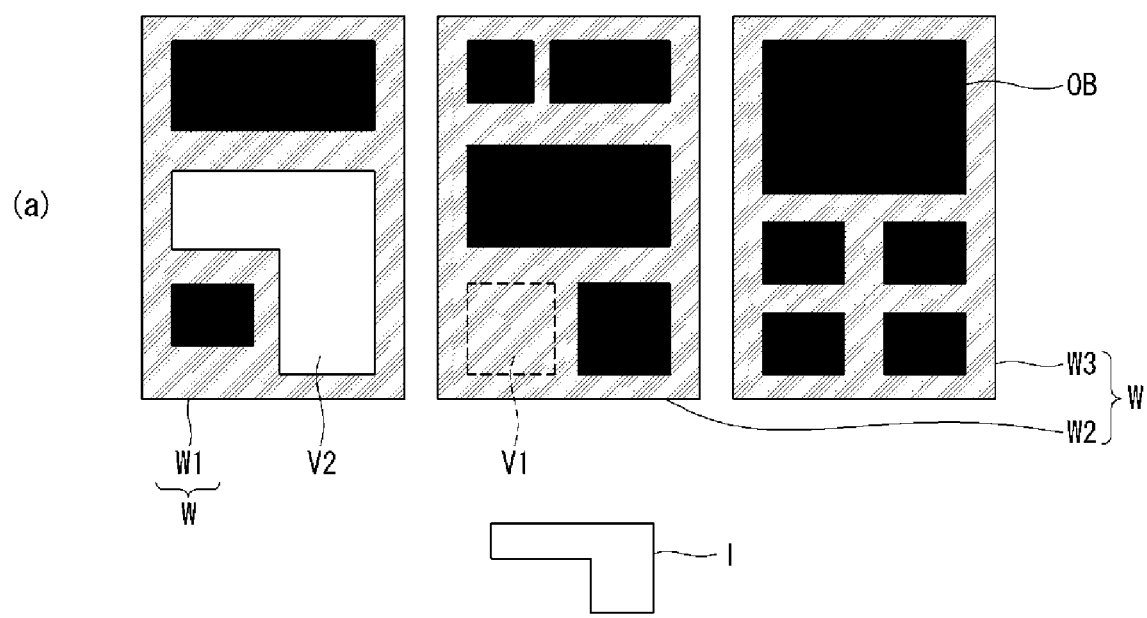
Figure 15:
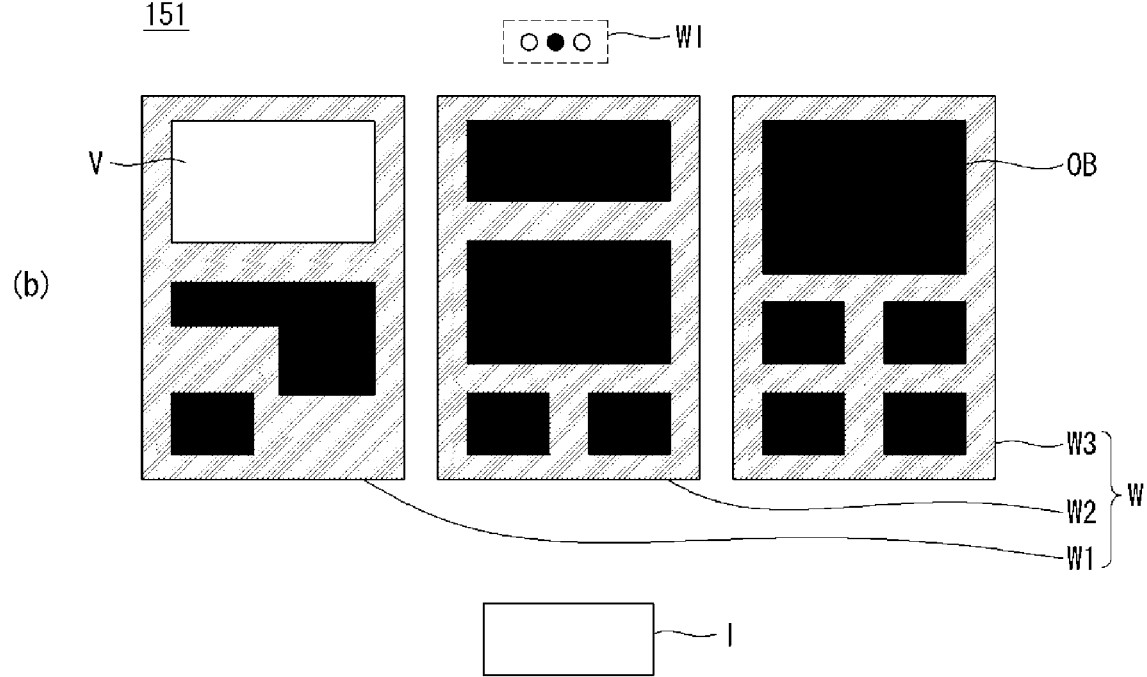

As shown in FIG. 15 (a), the user may want to add an icon I having a specific shape and size to the wallpaper W. The controller 180 may display a space for displaying the added icon I based on the shape and size of the icon I. For example, the controller 180 may inactivate the overall area of the third wallpaper W3 that is occupied by objects OB and may have no vacancy for displaying the icon I. The second wallpaper W2 may have a first vacancy V1 that is not occupied by an object OB. However, the icon I may not be fitted in the first vacancy V1 because of its shape and size. Accordingly, the controller 180 may also inactivate the overall area of the second wallpaper W2. The first wallpaper W1 may have a second vacancy V2 that is not occupied by an object OB. Further, the second vacancy V2 may have a shape and a size suitable for the shape and the size of the icon I. Accordingly, the controller 180 may activate the second vacancy V2 in the first wallpaper W1 and inactivate the remaining part of the first wallpaper W1. That is, the controller 180 may display the area where the added icon I may be located such that the area is discriminated from other areas to improve ease of use.

As shown in FIG. 15 (b), the controller 180 may display an appropriate vacancy V in consideration of the size of an icon I to be added.

Figure 16:
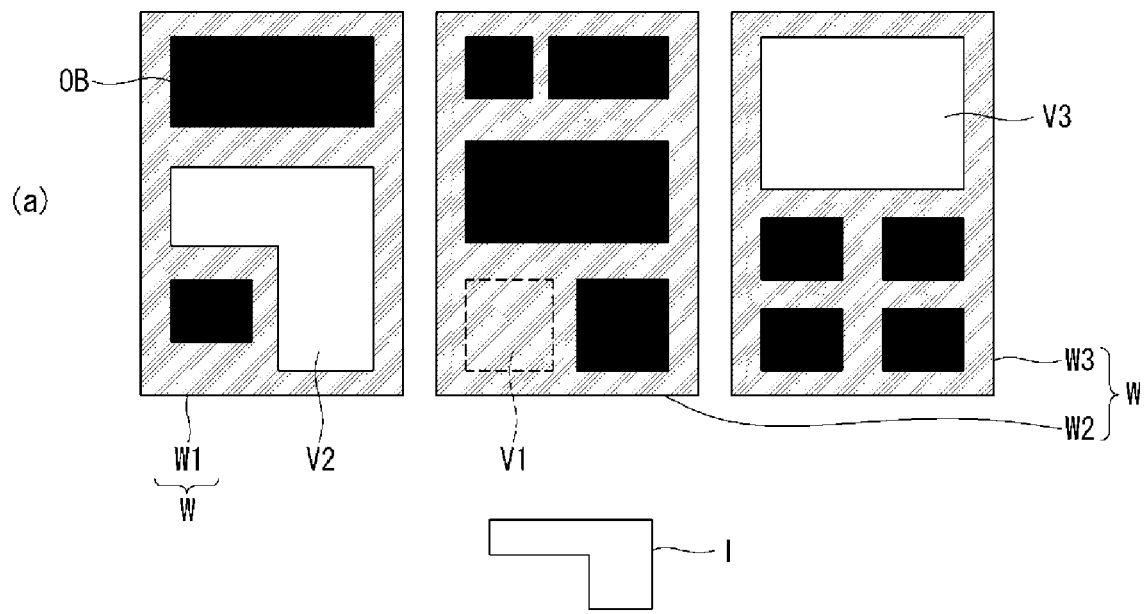
Figure 16:
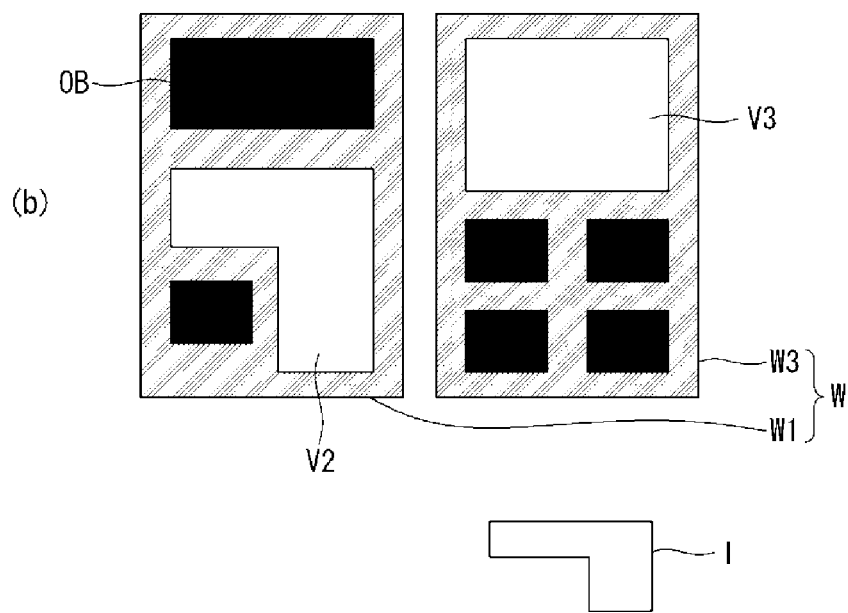

As shown in FIG. 16 (a), the second wallpaper W2 (from among the first, second and third wallpapers W1, W2 and W3) may not have a vacancy for displaying the added icon I. Accordingly, the controller 180 may activate a second vacancy V2 and a third vacancy V3 in which the icon I may be located and may inactivate other areas.

As shown in FIG. 16 (b), the controller 180 may display only a wallpaper W having a vacancy for displaying an icon I. More specifically, the second wallpaper W2 may not have an appropriate space in FIG. 16 (a), and thus the controller 180 may display only the first wallpaper W1 and the third wallpaper W3 on the display 151.

Figure 17:
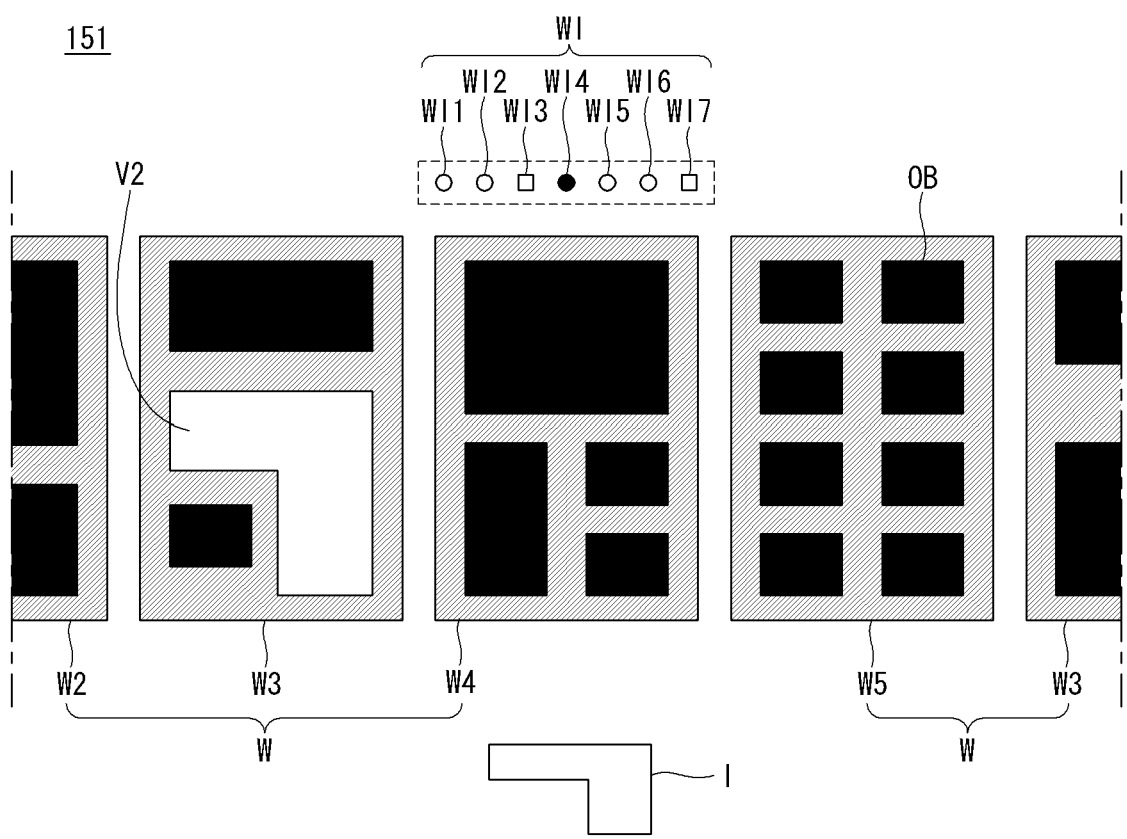

As shown in FIG. 17, the controller 180 may change the display of wallpaper indicators WI such that the user may be intuitively aware of an appropriate location for displaying an icon I. The wallpaper indicators WI respectively correspond to wallpapers W, as described above. Accordingly, the controller 180 may change the display of the wallpaper indicators WI respectively corresponding to wallpapers to inform the user of a wallpaper having a vacancy for displaying the added icon I. For example, the third wallpaper indicator W13 and the seventh wallpaper indicator W17 may have a shape different from other wallpaper indicators, as show in FIG. 17. The third wallpaper indicator W13 having a shape different from others may represent that the third wallpaper W3 corresponding to the third wallpaper indicator W13 has a vacancy V2 for displaying the icon I. Further, a seventh wallpaper indicator corresponding to the seventh wallpaper indicator W17 may have a vacancy for displaying the icon I, which is not shown in FIG. 17. That is, even when all the wallpapers may not be displayed due to a physical size limit of the display 151, a wallpaper having a vacancy may be indicated by the wallpaper indicator corresponding thereto, which may improve the ease of use.

Figure 18:
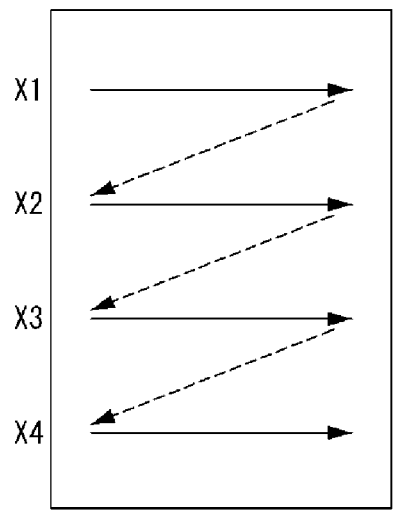
Figure 18:
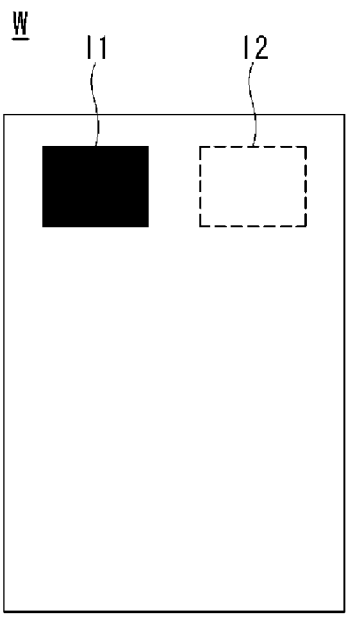
Figure 18:
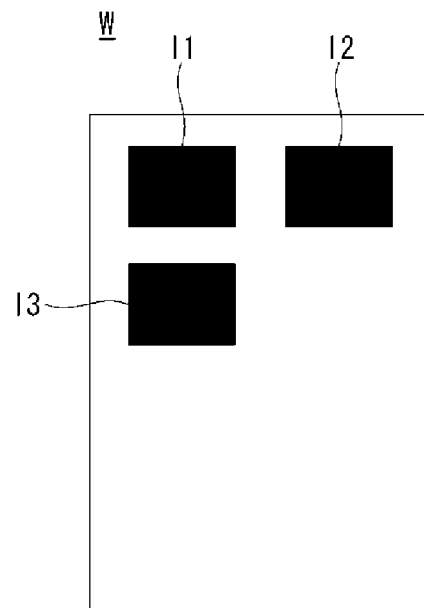

FIG. 18 (a) illustrates an order of adding icons to the wallpaper W. As shown in FIG. 18 (a), the icons may be arranged from an upper part X1 to a lower part X4 when the user does not designate specific positions. Additionally, the icons may be arranged from the left to the right on a same line.

As shown in FIG. 18 (b), the first icon I1 may be located on the wallpaper W. When the second icon I2 is added to the wallpaper W (that includes the first icon I1), the second icon I2 may be located on the right of the first icon I1. As shown in FIG. 18 (c), when the first and second icons I1 and I2 are arranged on the first line of the wallpaper W, the third icon I3 may be located on the left of a second line. That is, the icons may be arranged from the top left of the wallpaper to the bottom right of the wallpaper.

The above-described method of controlling the mobile terminal may be written as and/or include computer programs and may be implemented in digital microprocessors that execute programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that may be thereafter read by a computer system. Examples of the computer readable recording medium may include read-only memory (ROM), random-access memory (RAM), CD-ROMs, DVD±ROM, DVD-RAM, magnetic tapes, floppy disks, and/or optical data storage devices. The computer readable recording medium may also be distributed over network coupled computer systems so that the computer readable code is stored and executed in a distribution fashion.

A mobile terminal may include a first touch screen to display a first object, a second touch screen to display a second object, and a controller configured to receive a first touch input applied to the first object and to link the first object to a function corresponding to the second object when receiving a second touch input applied to the second object while the first touch input is maintained.

A method may also include displaying a first object on the first touch screen, displaying a second object on the second touch screen, receiving a first touch input applied to the first object, and linking the first object to a function corresponding to the second object when a second touch input applied to the second object is received while the first touch input is maintained.

Figure 19:
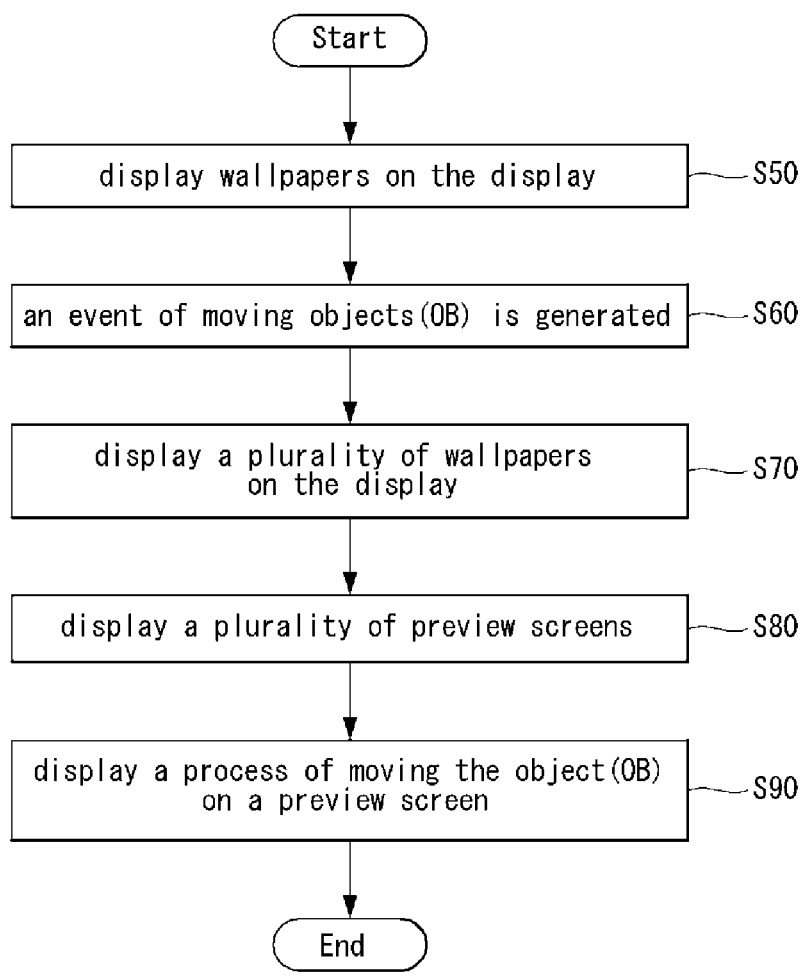
FIG. 19 is a flowchart illustrating an operation of a mobile terminal according to another exemplary embodiment.

FIG. 19 illustrates an operation of a mobile terminal according to another embodiment and FIGS. 20 to 23 illustrate an operation of the mobile terminal shown in FIG. 19.

As shown in FIGS. 19 to 23, the controller (180 of FIG. 1) of the mobile terminal 100 according to another embodiment may display wallpapers W on the display 151 (S50).

Figure 20:
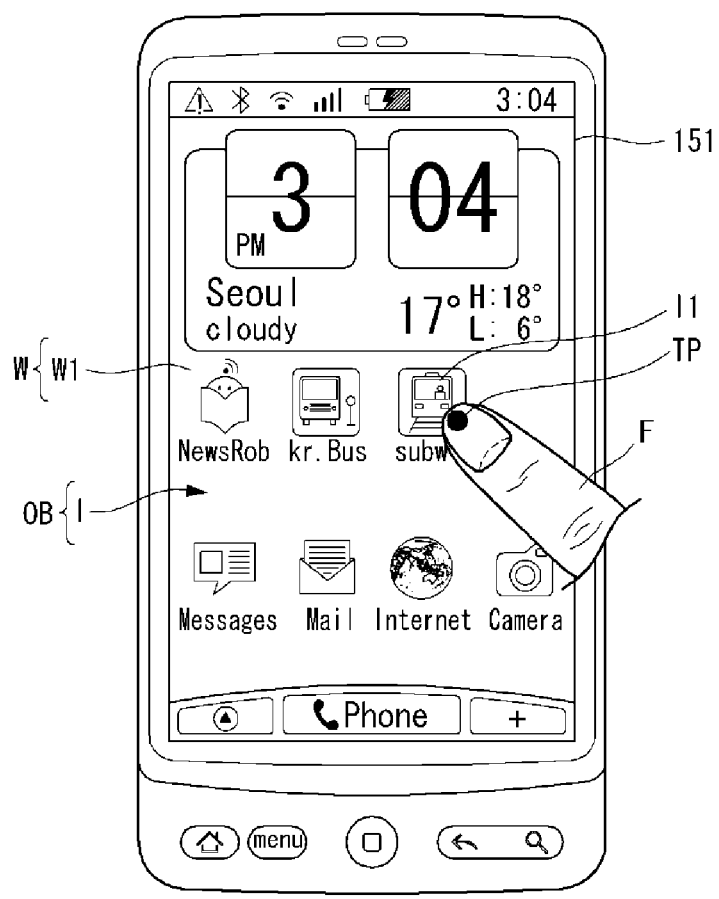
FIGS. 20 to 23 illustrate an operation of the mobile terminal shown in FIG. 19.

Referring to FIG. 20, a first wallpaper W1 from among a plurality of wallpapers W may be displayed on the display 151 of the mobile terminal 100. The first wallpaper W1 may include objects OB. The objects OB may include normal icons I and widget icons (WD of FIG. 5), as described above. In the following, the normal icons I are described and description of the widget icons (WD of FIG. 5) is omitted.

The objects OB may be moved (S60).

An operation of touching an object OB displayed on the display 151 may include the following events. A first event may be an event of executing the touched object OB. For example, when a first icon I1 located on the first wallpaper W1 is touched with a finger F and then short touched within a short time, a function corresponding to the first icon I1 can be executed. A second event may be an event of moving the touched object OB. For example, when the first icon I1 located on the first wallpaper W1 is long touched, the mobile terminal 100 can enter a move mode in which the first icon I1 is moved to the first wallpaper W1 or other wallpaper W. The function of the first icon I1 may not be executed in the move mode. Accordingly, the user can move icons I by dragging the first icon I1 and other icons I. In the following, a touch point TP touched by a finger F, instead of the finger F touching the display 151, is shown for convenience of understanding.

Figure 21:
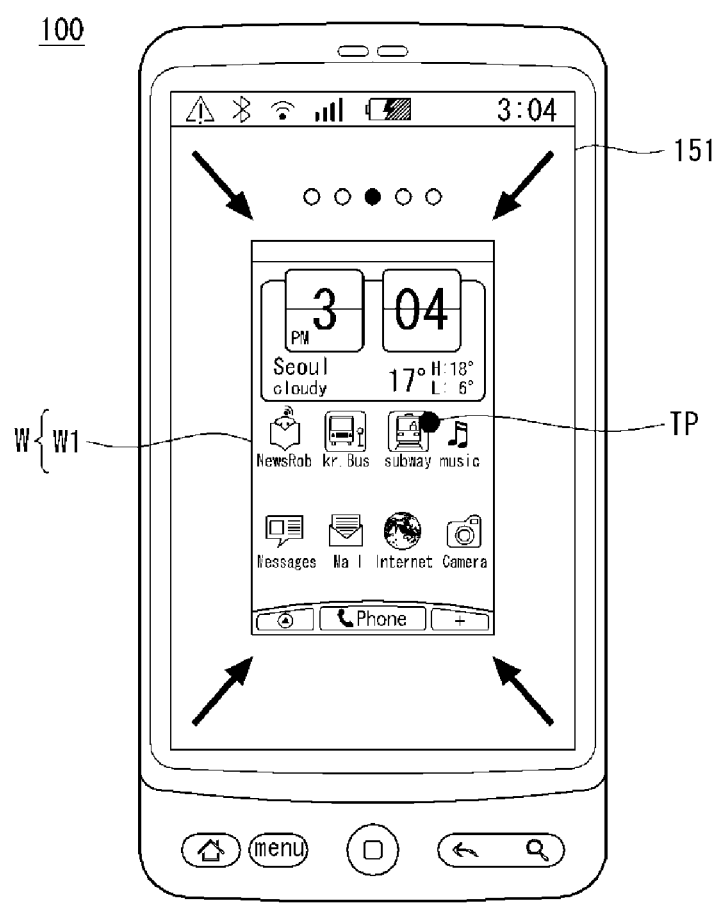

When the mobile terminal enters the icon move mode, the controller (180 of FIG. 1) can reduce the area of a wallpaper W displayed on the display 151, as shown in FIG. 21. That is, when long touch applied to the touch point TP is maintained for a predetermined time or longer, the area of the first wallpaper W1 is continuously reduced and thus a space can be generated on the display 151.

Upon generation of an event of moving the object Oft a plurality of wallpapers W may be displayed on the display 151 (S70).

Figure 22:
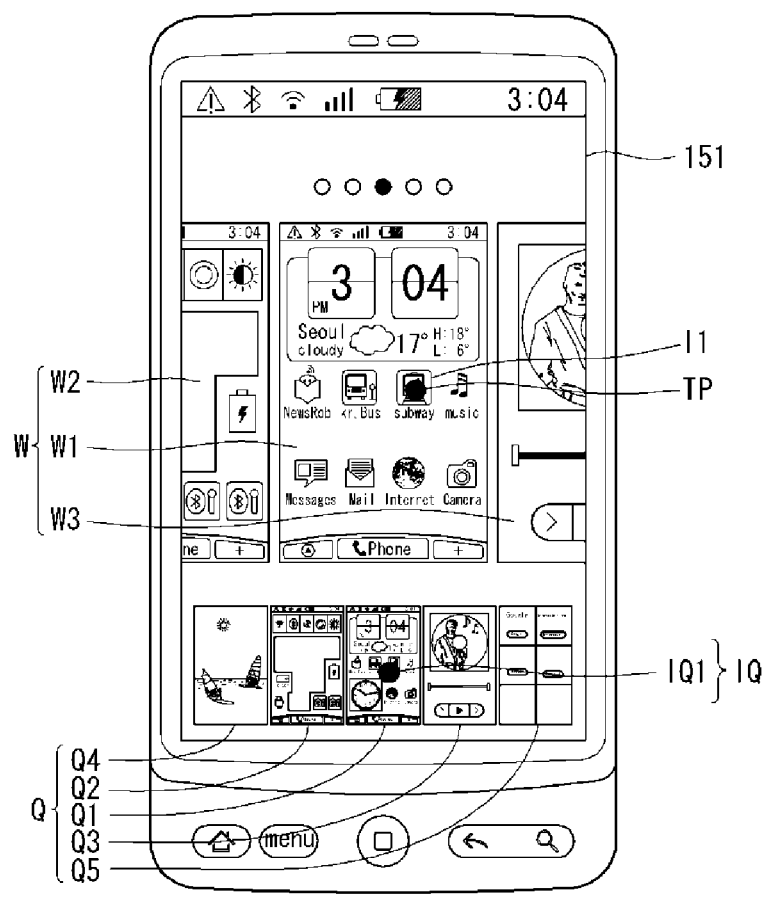

Referring to FIG. 22, the plurality of wallpapers W may include first wallpaper W1 having a reduced size, second and third wallpapers W2 and W3 respectively located on the left and right sides of the first wallpaper W1. However, the number of plural wallpapers W displayed on the display 151 is not limited thereto and the number and display forms of wallpapers W may be varied according to the resolution and/or size of the display 151.

The plurality of wallpapers W displayed on the display 151 may be changed. For example, when the user drags the display to the left or right while maintaining the touch point TP with respect to the first icon I1, a fourth wallpaper or a fifth wallpaper may be sequentially displayed.

Upon display of the plurality of wallpapers W, a plurality of preview screens Q may be displayed (S80).

The preview screens Q may be reduced images respectively corresponding to the plurality of wallpapers W. The preview screens Q can reflect states of the wallpapers W on the screen of the display 151, distinguished from the plurality of wallpapers W. The preview screens Q briefly show arrangement states of objects OB included in the wallpapers W. That is, the user can manipulate an object OB displayed on a wallpaper W by touching the object OB whereas the user cannot manipulate a preview icon Q1 displayed on a preview screen Q even when the user touches the preview icon Q1. As described above, the preview screens Q can display the wallpapers W in a small size by showing only arrangement state of objects OB included in the wallpapers W. Accordingly, the preview screens Q can be less limited by the size and/or resolution of the display 151. For example, the preview screens Q can display states of all wallpapers W while one to three wallpapers W are displayed. This is illustrated in FIG. 22. That is, the first, second and third wallpapers W1, W2 and W3 are displayed while first to fifth preview screens Q1 to Q5 are displayed. Since the first to fifth preview screens Q1 to Q5 are displayed, it is not necessary to check the wallpapers W one by one by moving the wallpapers W to the left or right.

A region in which an object OB can be located may be displayed in a preview screen Q. For example, a vacancy to which a selected object OB can be moved may be displayed as a bright region and a region in which an object OB cannot be located may be displayed as a dark region. In FIG. 22, the first, third, fourth and fifth preview screens Q1, Q3, Q4 and Q5 that do not have a vacancy for displaying the first icon I1 are inactivated and displayed as dark regions and the second preview screen Q2 having a vacancy is activated and displayed as a bright region. Since a vacancy to which the selected first icon I1 can be moved is displayed in a preview screen Q, the user of the mobile terminal 100 can intuitively recognize the position to which the first icon I1 can be moved.

Upon display of the plurality of preview screens Q, a process of moving the object OB may be displayed on a preview screen Q (S90).

The user can move the first icon I1 corresponding to an object OB displayed on the first wallpaper W1 to another wallpaper W. As shown in FIG. 22, the user can touch and drag the first icon I1 in a desired direction while maintaining the touch point TP on the first icon I1.

When the first icon I1 is touched and moved, movement of the object OB can be displayed on a preview screen Q. A shape corresponding to the object OB displayed on the wallpaper W may be displayed on the preview screen Q. For example, a first preview icon IQ1 corresponding to the first icon I1 displayed on the wallpaper W can be displayed on the preview screen Q. When the first icon I1 is manipulated, manipulation of the first icon I1 can be reflected in the first preview icon IQ1. For example, if the user moves the first icon I1 from the initial position thereof to the left of the display 151 by touching the first icon I1, the first preview icon IQ1 displayed on the preview screen Q can be moved in the same direction. Referring to FIG. 22, when the first icon I1 located on the first wallpaper W1 is touched and dragged, the first preview icon IQ1 displayed on the first preview screen Q1 can be moved in the same direction. Deletion of the object OB can be performed in the same manner. That is, upon deletion of the first icon I1, the first preview icon IQ1 can be deleted.

Figure 23:
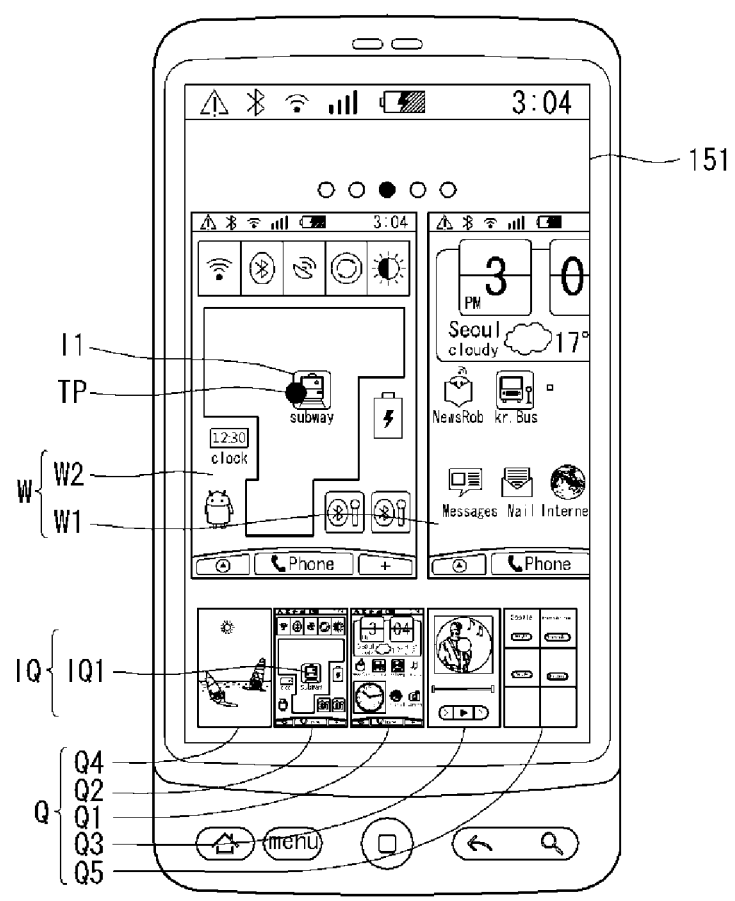

When the user moves the first icon I1 while touching the first icon I1, the preview screen Q can be changed according to movement of the first icon I1. Referring to FIG. 23, when the user drags the first icon I1 to the second wallpaper W2, the first preview icon IQ1 of the preview screen W can be moved to the second preview screen Q2.

Figure 24:
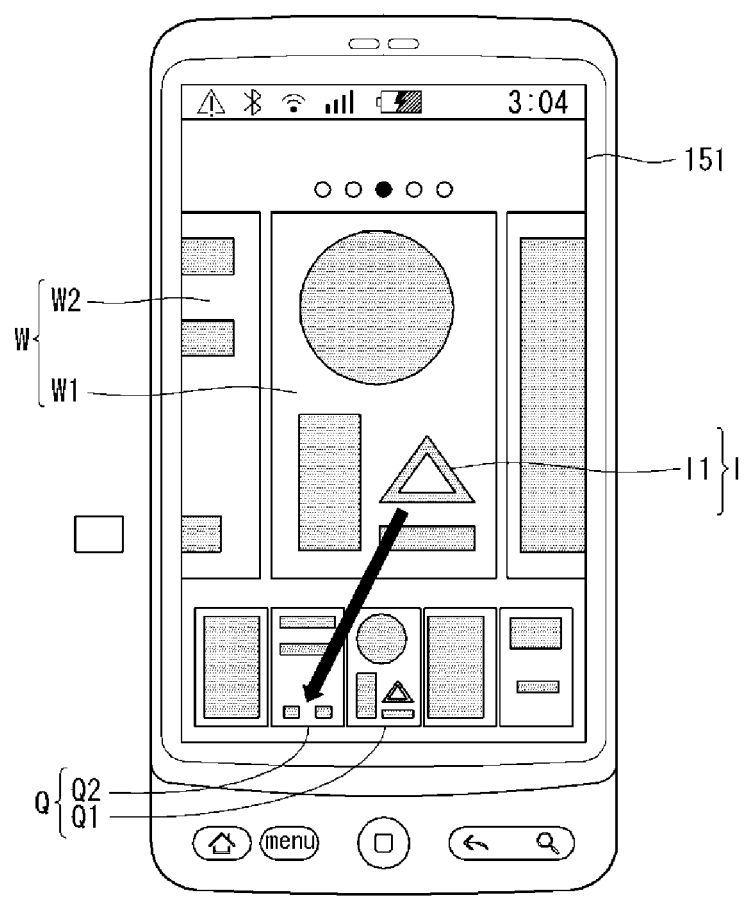
FIGS. 24 and 25 illustrate another operation of the mobile terminal shown in FIG. 19.
Figure 25:
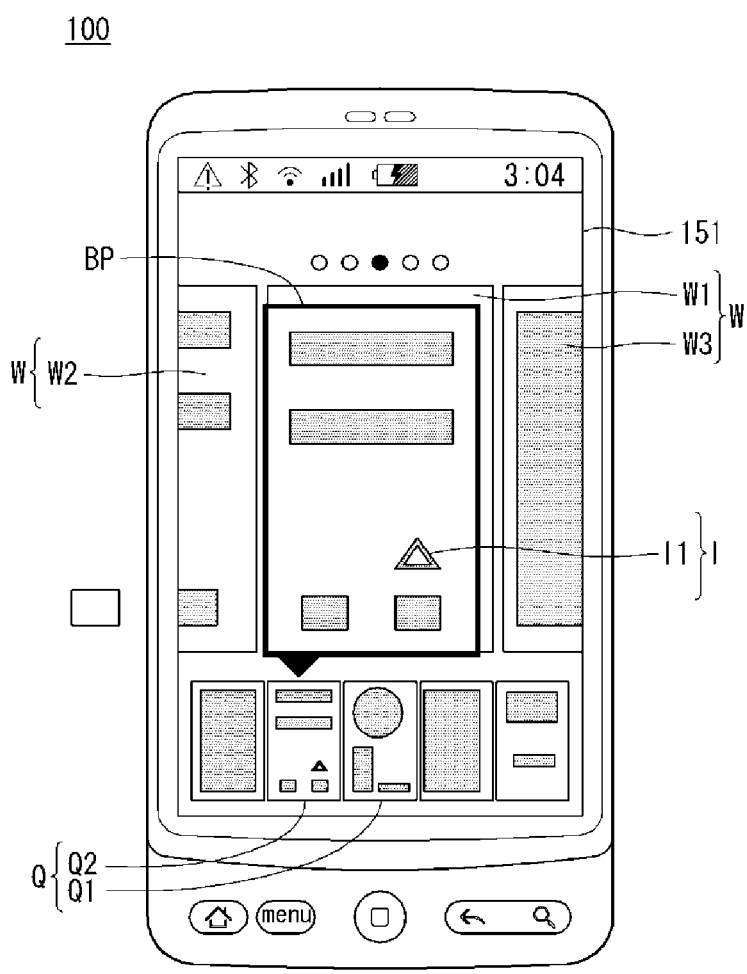

FIGS. 24 and 25 illustrate another operation of the mobile terminal shown in FIG. 19.

As shown in FIGS. 24 and 25, the mobile terminal 100 according to one embodiment can move an icon I to a specific preview Q. Furthermore, upon movement of the icon I to the specific preview screen Q, a preview pop-up window BP can be displayed. In the following, display of the wallpapers W and preview screens Q of the display 151 will be simplified for easiness of understanding.

Referring to FIG. 24, the display 151 may display reduced wallpapers W and preview screens Q. The user can move the first icon I1 displayed on the first wallpaper W to a second preview screen Q2. The user can move the first icon I1 to the second preview screen Q2 by selecting the first icon I1 and dragging the first icon I1 to the second preview screen Q2.

Referring to FIG. 25, when the user drags and drops the first icon I1 from the first wallpaper W1 to the second preview screen Q2, the preview pop-up window BP can be displayed. The preview pop-up window BP may be the enlarged second preview screen Q2. As described above, since the second preview screen Q2 is small, the user may not directly manipulate the preview icon (IQ of FIG. 23) displayed on the second preview screen Q2. However, the user may touch an icon I displayed on the preview pop-up window BP enlarged to be similar to the size of a wallpaper W. That is, the user can adjust icon arrangement by touching icons I displayed on the preview pop-up window BP. The preview pop-up window BP can disappear when the user touches a region outside the preview pop-up window BO or the user touches an icon I and drags the touched icon I to the outside of the preview pop-up window BP or after a lapse of predetermined time.

The same image as the wallpaper W corresponding to the preview pop-up window BP may be displayed on the preview pop-up window BP. For example, if the first wallpaper W1 displays a car, the preview pop-up window BP can display the car. Since the preview pop-up window BP and the wallpaper W corresponding thereto display the same image, the user can arrange icons I in consideration of harmony with the image. For example, when the first icon I1 is black, the first icon I1 can be displayed such that the first icon I1 is not located in a black region.

Figure 26:
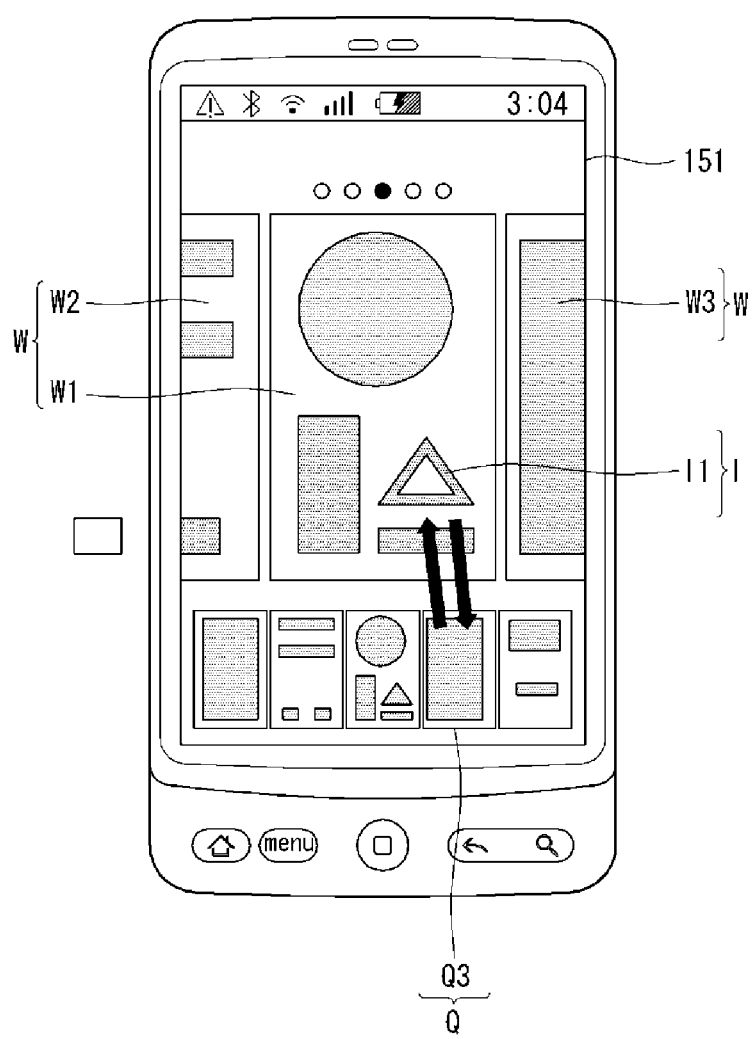
FIG. 26 illustrates another operation of the mobile terminal shown in FIG. 19.

FIG. 26 illustrates another operation of the mobile terminal shown in FIG. 19.

As shown in FIG. 26, the controller (180 of FIG. 1) of the mobile terminal 100 according to an embodiment can return an icon I to the initial position thereof when the user locates the icon I in an inappropriate preview pop-up window BP. For example, the user may want to locate the first icon I1 on a third preview screen Q3. However, the third preview screen Q3 may not have a vacancy for displaying the first icon I1. That is, the third wallpaper W3 corresponding to the third preview screen Q3 has no appropriate space. In this case, when the user drags the first icon I1 and drops the first icon I1 to the third preview screen Q3, the controller (180 of FIG. 1) can return the first icon I1 to the initial position thereof on the first wallpaper W1. Returning of the first icon I1 to the initial position on the first wallpaper W1 may be displayed as if the first icon I1 is moving according to animation effect.

Figure 27:
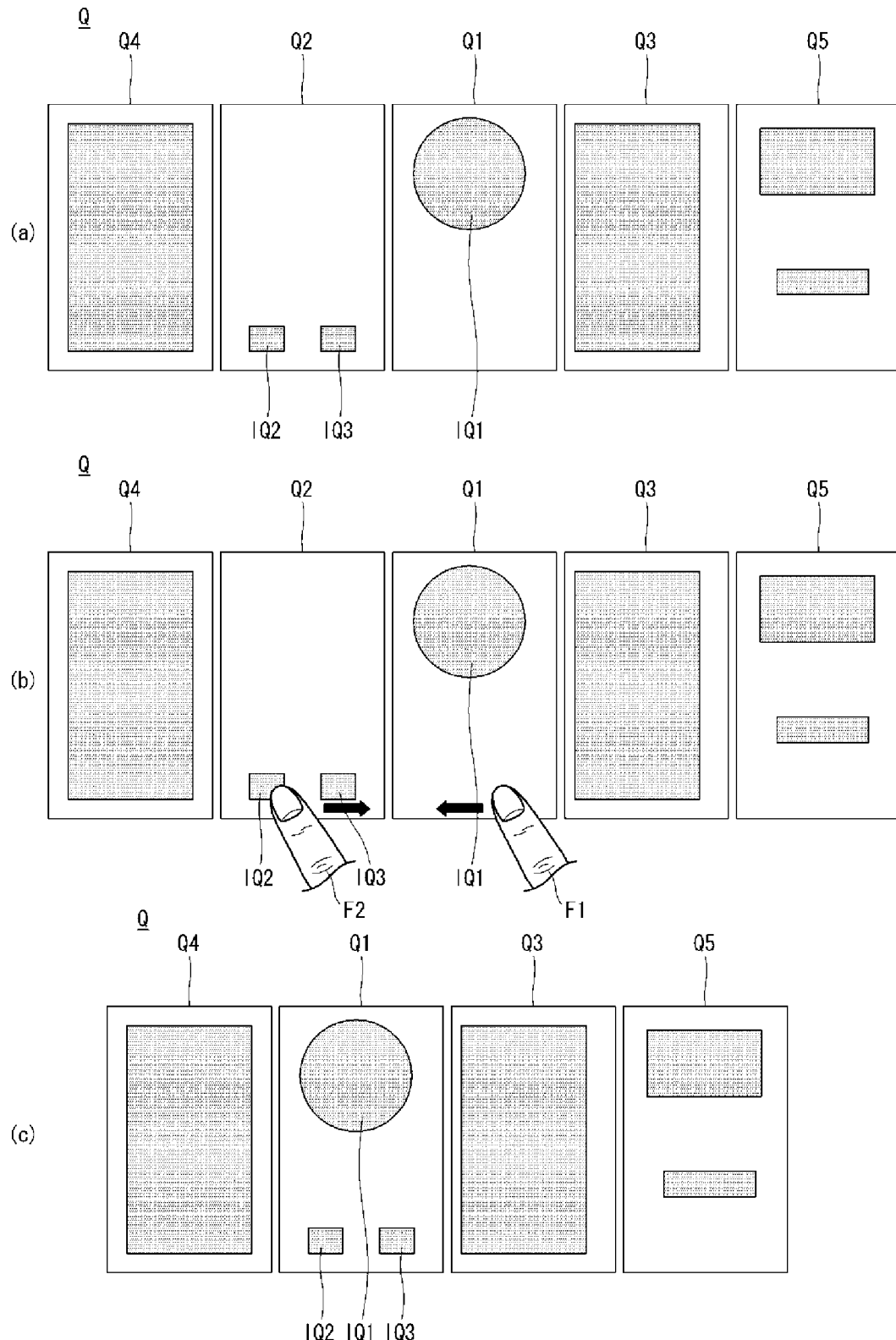
FIGS. 27, 28 and 29 illustrate another operation of the mobile terminal shown in FIG. 19.
Figure 28:
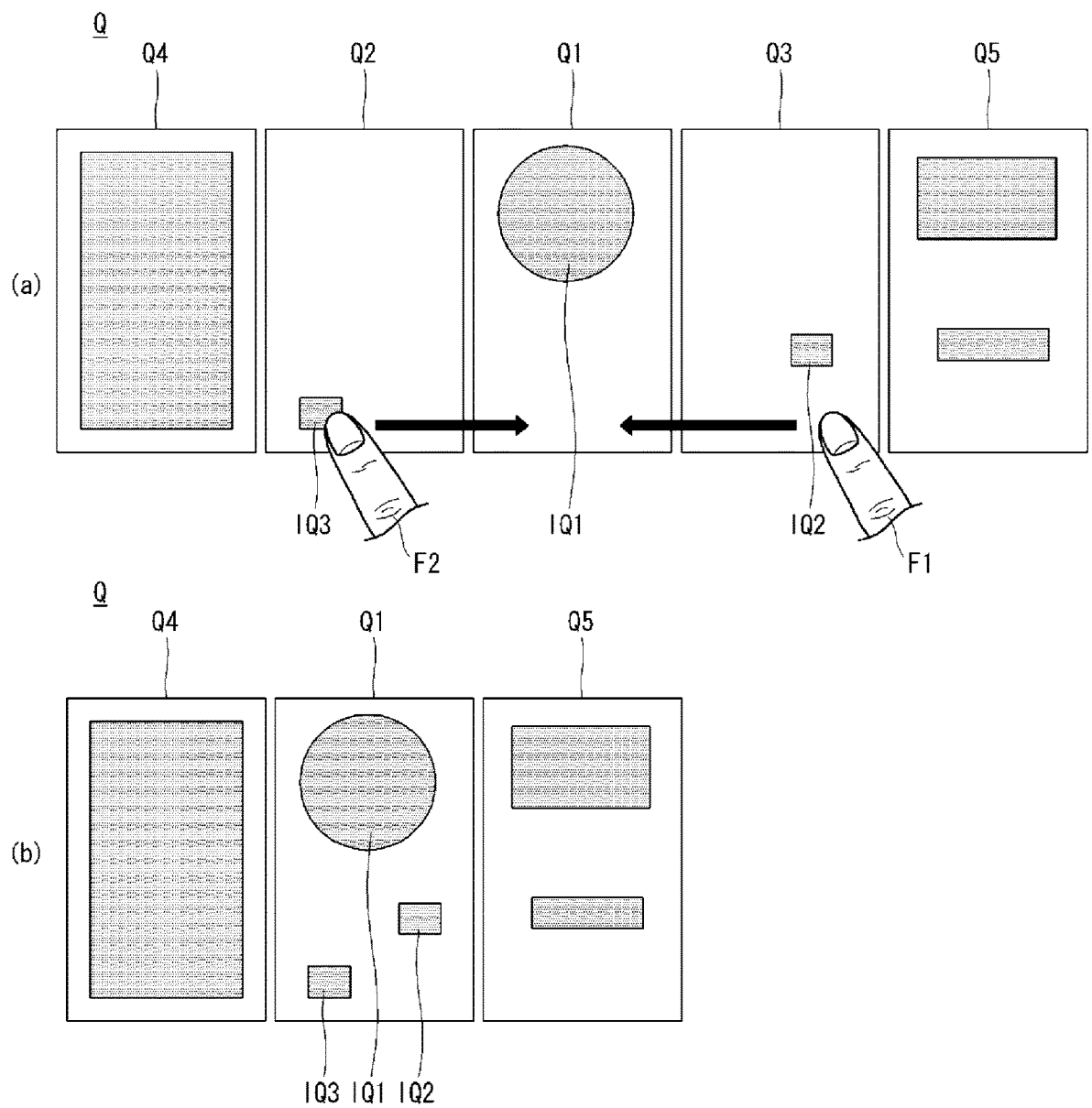
Figure 29:
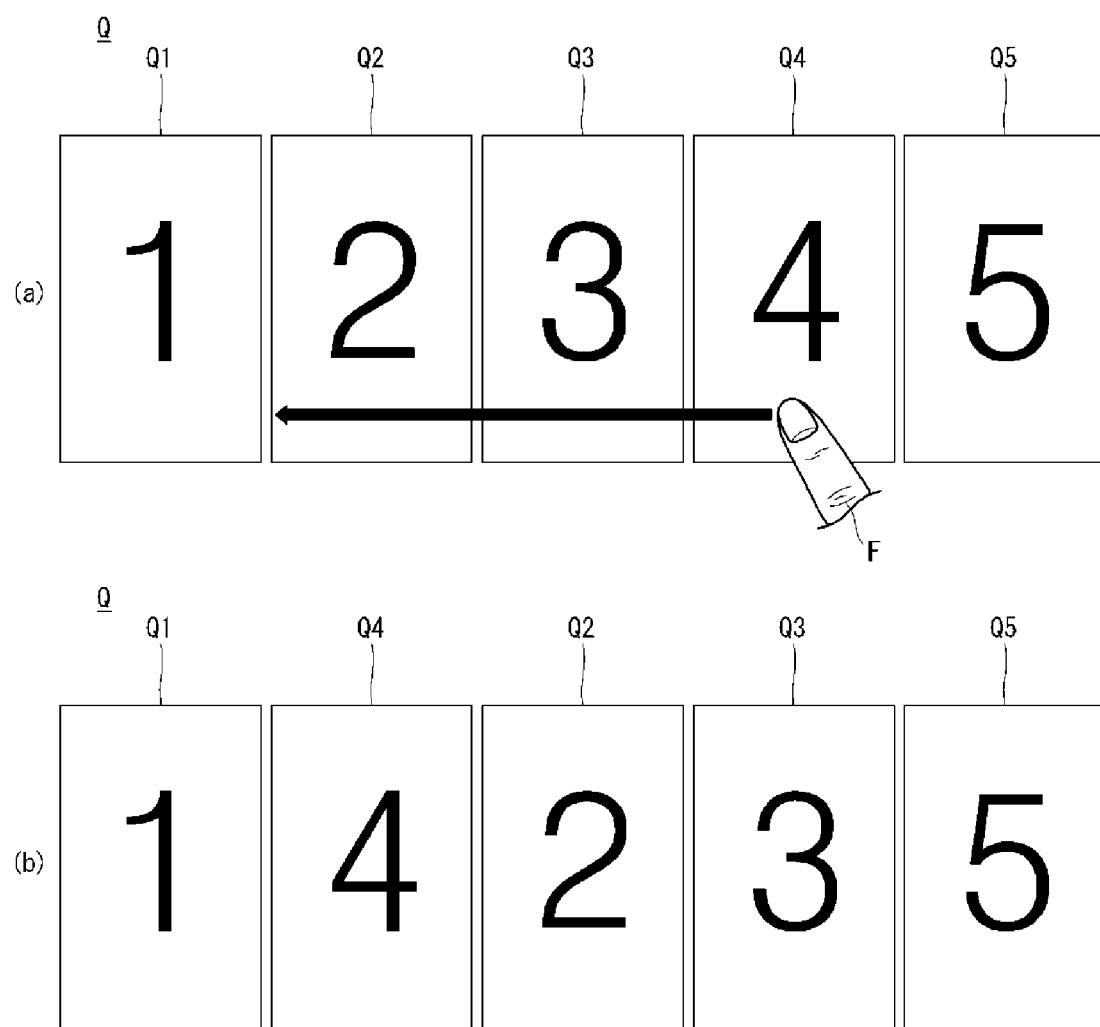

FIGS. 27, 28 and 29 illustrate another operation of the mobile terminal of FIG. 19.

As shown in FIGS. 27, 28 and 29, the controller (180 of FIG. 1) of the mobile terminal 100 according to an embodiment can combine preview screens Q or wallpapers W or change the sequence of preview screens Q or wallpapers W. Since a preview screen Q reflects a wallpaper W corresponding thereto, when one of the preview screen Q and wallpaper W is manipulated, the other can respond to the manipulation in the same manner as the one of them. Accordingly, only manipulation of a preview screen Q will be described in the following.

Referring to FIG. 27(a), first to fifth preview screens Q1 to Q5 may be displayed. A first preview icon IQ1 may be displayed on the first preview screen Q1 and second and third preview icons IQ2 and IQ3 may be displayed on the second preview screen Q2.

Referring to FIG. 27(b), the user may drag two preview screens Q in a direction in which the two preview screens Q become close to each other. For example, the user can touch the first preview screen Q1 with a first finger F1, touch the second preview screen Q2 with a second finger F2 and drag the touches in a direction in which the touches become close to each other. Upon dragging of the first and second preview screens Q1 and Q2, the selected preview screens Q can be combined.

Referring to FIG. 27(c), the second and third preview icons IQ2 and IQ3 included in the second preview screen Q2 can be moved to the first preview screen Q1. Accordingly, the first, second and third preview icons IQ1, IQ2 and IQ3 can be displayed on the first preview screen Q1.

Referring to FIG. 28(a), the user can drag the second and third preview screens Q2 and Q3 to the first preview screen Q1 using the first and second fingers F1 and F2.

Referring to FIG. 28(b), the second and third preview screens Q2 and Q3 dragged by the first and second fingers F1 and F2 of the user can be combined with the first preview screen Q1. Accordingly, the first, second and third preview icons IQ1, IQ2 and IQ3 can be displayed on the first preview screen Q1.

Referring to FIG. 29(a), the first to fifth preview screens Q1 to Q5 may be displayed. The user can touch and drag the fourth preview screen Q4 and drop the fourth preview screen Q4 between the first and second preview screens Q1 and Q2.

Referring to FIG. 29(b), the fourth preview screen Q4 dragged by the user can be displayed between the first and second preview screens Q1 and Q2.

FIGS. 30 to 34 illustrate another operation of the mobile terminal of FIG. 19.

As shown in FIGS. 30 to 34, the controller (180 of FIG. 1) of the mobile terminal 100 according to an embodiment of the present invention can select a plurality of icons I displayed on wallpapers W and move the selected icons I to preview screens Q. An operation of moving an icon I to a preview screen Q corresponds to an operation of moving the icon I to a wallpaper, as described above.

Figure 30:
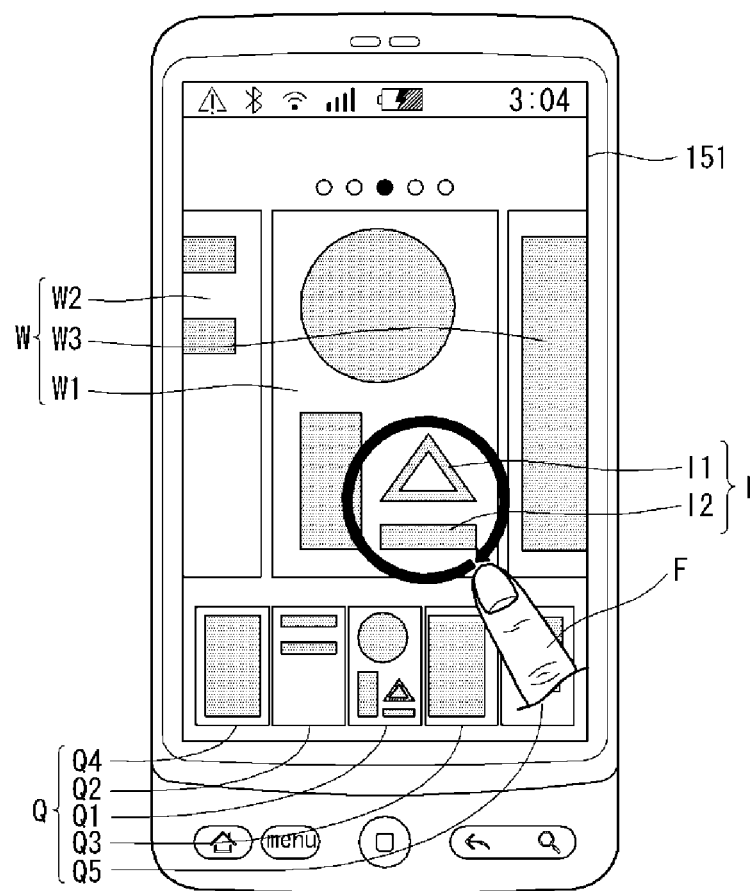
FIGS. 30 to 34 illustrate another operation of the mobile terminal shown in FIG. 19.

Referring to FIG. 30, the user can select first and second icons I1 and I2 by touching them using a finger F. The operation of touching the first and second icons I1 and I2 may be a touch operation of drawing a looped curve including the first and second icons I1 and I2.

Figure 31:
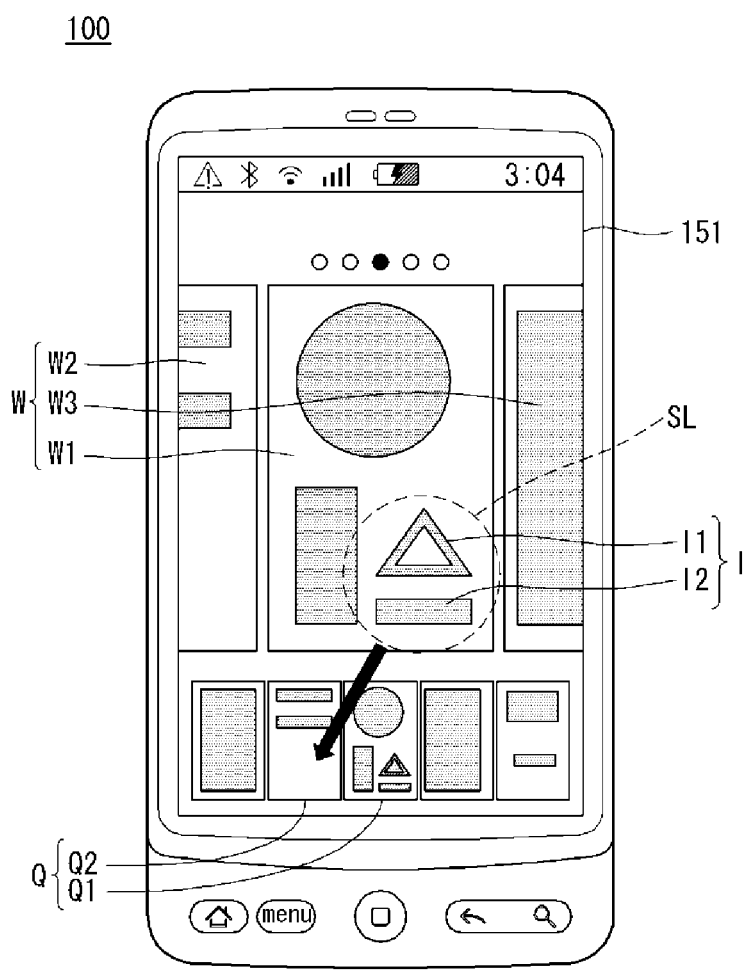

Referring to FIG. 31, to identify the first and second icons I1 and I2 selected by the user, the controller (180 of FIG. 1) can display an indicator SL around the first and second icons I1 and I2. The user can drag the first and second icons I1 and I2 indicated by the indicator SL and drop the first and second icons I1 and I2 to the second preview screen Q2.

Figure 32:
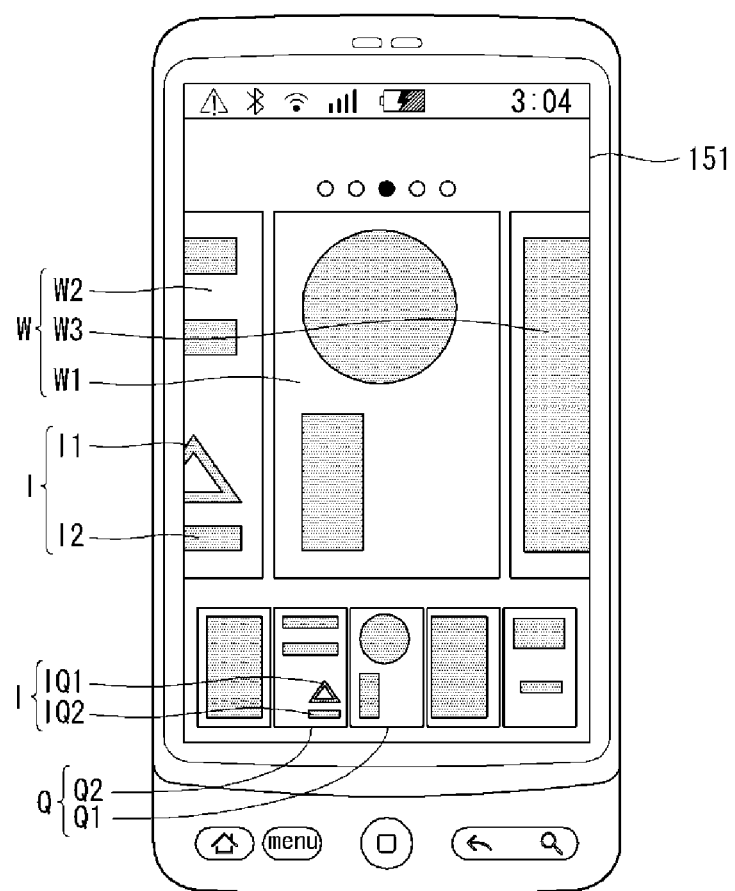

Referring to FIG. 32, the icons I1 and I2 dropped to the second preview screen Q2 by the user can be displayed as first and second preview icons IQ1 and IQ2. Here, part of the second wallpaper W2 is displayed on the display 151 and thus the user can recognize that the first and second icons I1 and I2 are also displayed in the second wallpaper W2.

Figure 33:
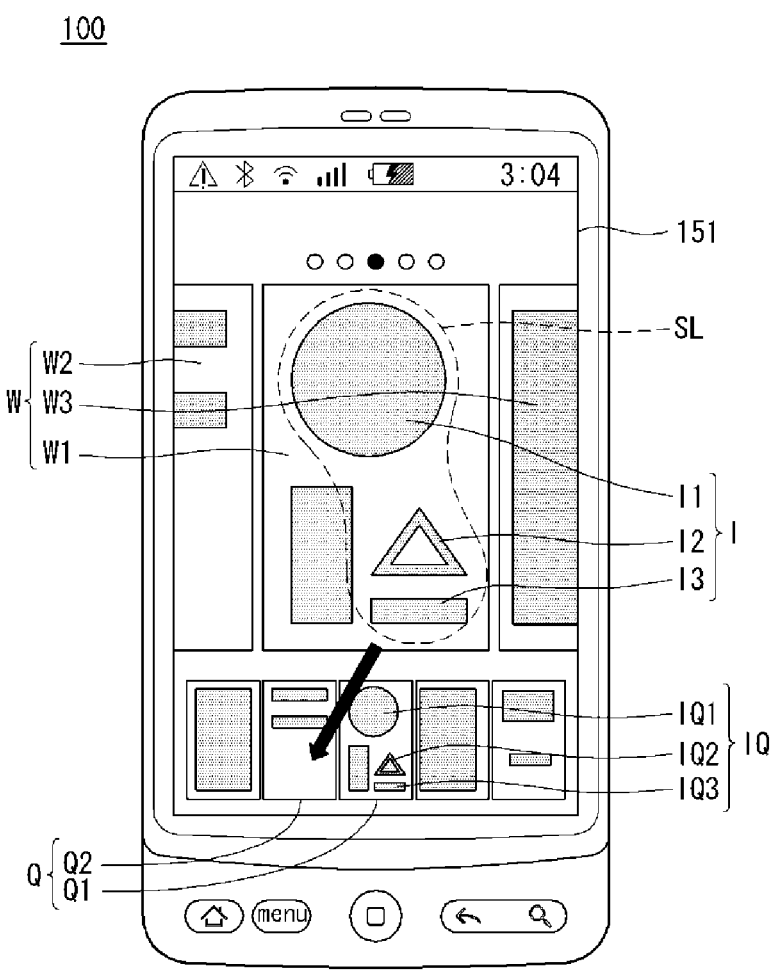

Referring to FIG. 33, the user can select the first, second and third icons I1, I2 and I3. The controller (180 of FIG. 1) can display the indicator SL to discriminate the selected first, second and third icons I1, I2 and I3 from other icons I. The user can drag and drop the selected first, second and third icons I1, I2 and I3 to the selected second preview screen Q2.

Figure 34:
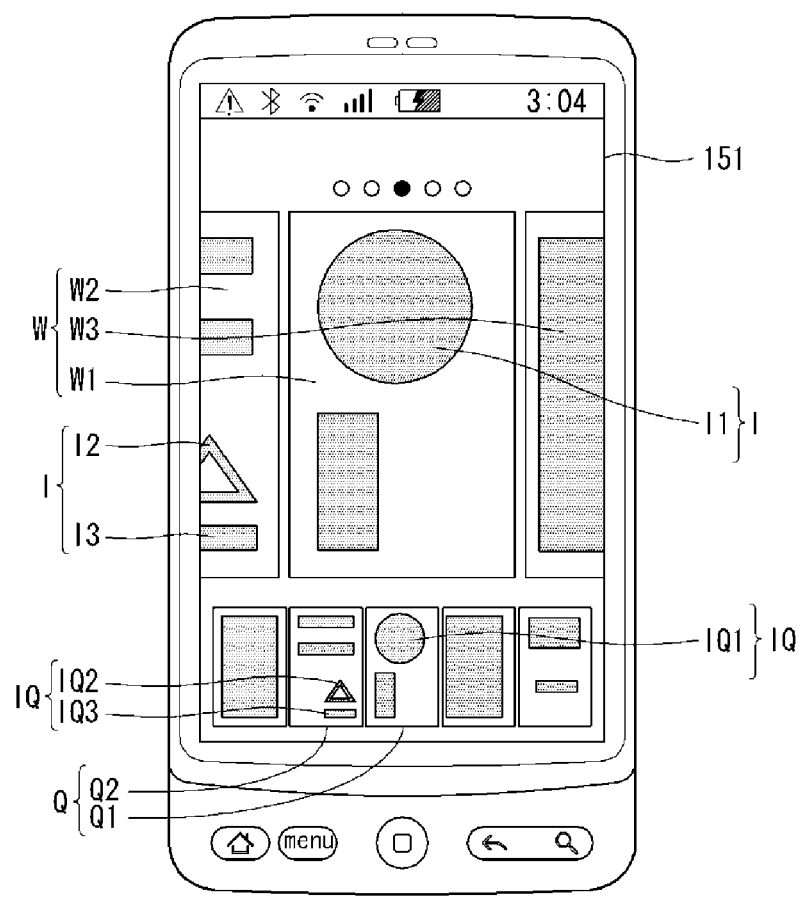

Referring to FIG. 34, the second and third preview screens IQ2 and IQ3 corresponding to the second and third icons I2 and I3 can be displayed on the second preview screen Q2. However, the first icon I1 and the first preview icon IQ1 corresponding thereto may not be moved from the initial position thereof. That is, when the second preview screen Q2 selected by the user has no spare space, the controller (180 of FIG. 1) can move only part of selected icons I to a selected preview screen Q. Here, a moved icon I and an icon I that is not moved may be determined according to predetermined standards such as an icon size, function, etc.

Figure 35:
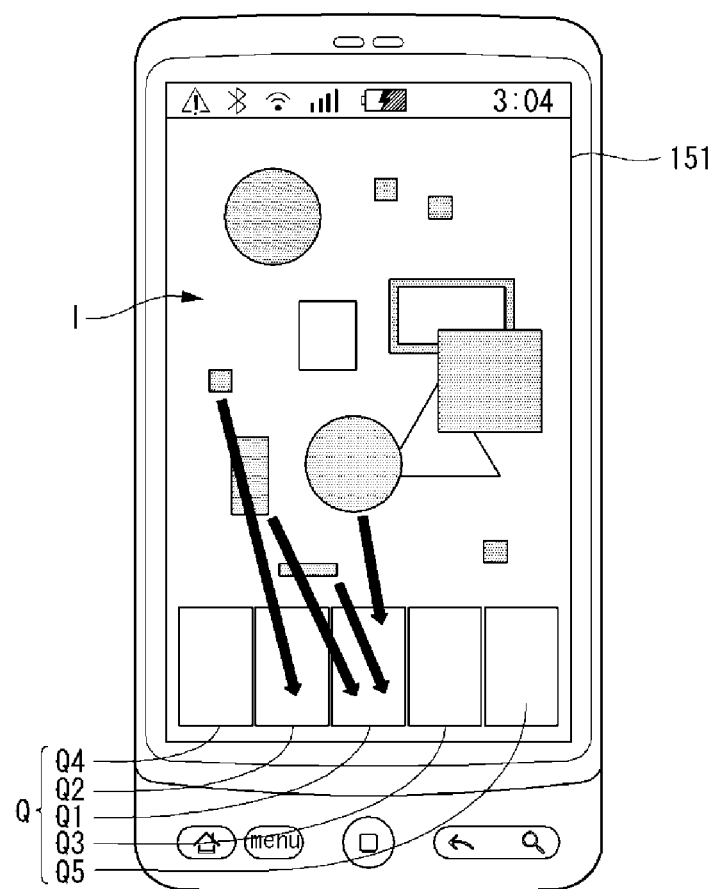
FIGS. 35, 36 and 37 illustrate another operation of the mobile terminal shown in FIG. 19.
Figure 36:
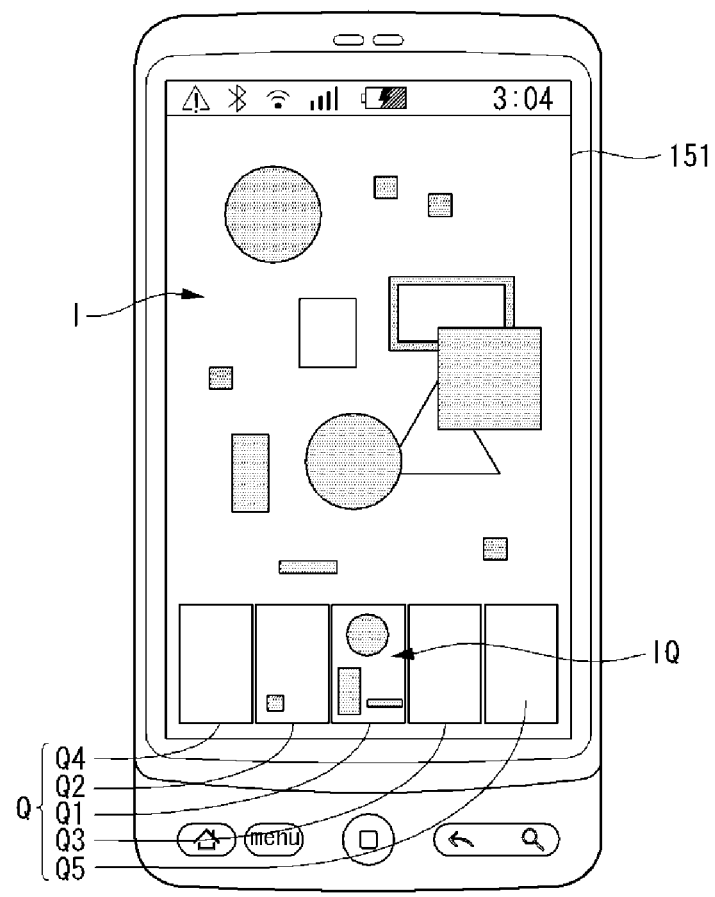
Figure 37:
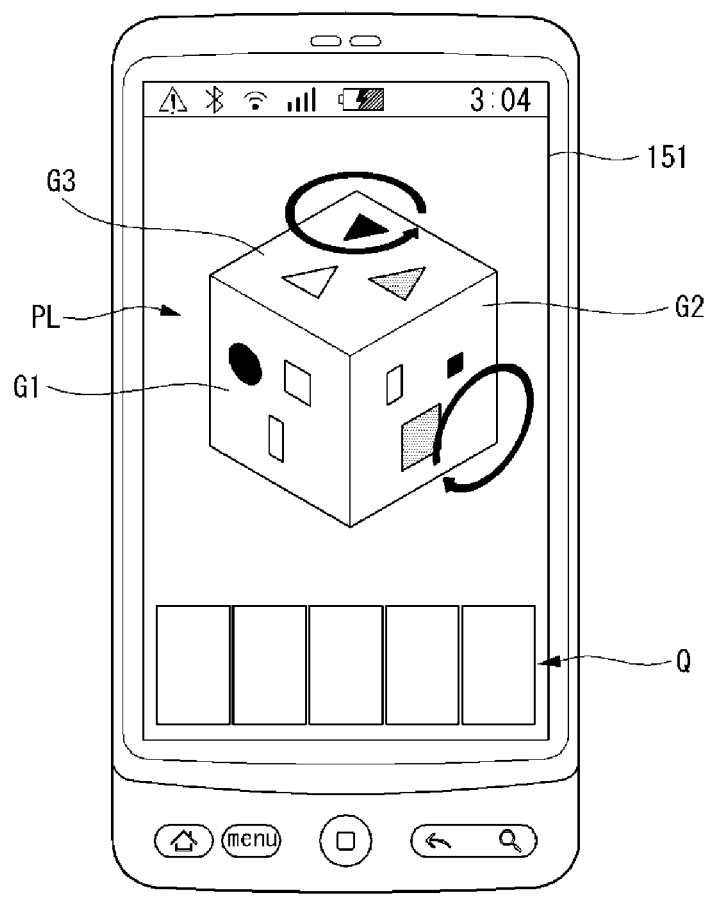

FIGS. 35, 36 and 37 illustrate another operation of the mobile terminal of FIG. 19.

As shown in FIGS. 35, 36 and 37, the mobile terminal according to an embodiment of the present invention can display a plurality of icons I on a predetermined area of the display 151 and then induce the icons I to be displayed on a desired preview screen Q.

Referring to FIG. 35, the controller (180 of FIG. 1) can display a plurality of icons I on the display 151. Each of the icons I may correspond to a specific application of the mobile terminal 100. When the mobile terminal 100 is initially used or the user performs a specific operation, the controller (180 of FIG. 1) can arrange the icons I and initialize preview screens Q. Upon initialization of the preview screens Q, wallpapers W corresponding to the preview screens Q can be initialized. The user can select desired icons I and drop the selected icons I to a preview screen Q.

Referring to FIG. 36, the icons I dropped by the user can be displayed on the preview screen Q as preview icons IQ.

Referring to FIG. 37, icons I may be displayed on a cube PL. The cube PL can be rotated on the basis of the vertical axis or horizontal axis. The icons I arranged in faces G1, G2 and G3 of the cube PL can be classified according to category to which icons I belong. For example, call related icons can be arranged in the first face G1, message related icons can be arranged in the second face G2 and augmented reality related icons can be arranged in the third face G3.

Figure 38:
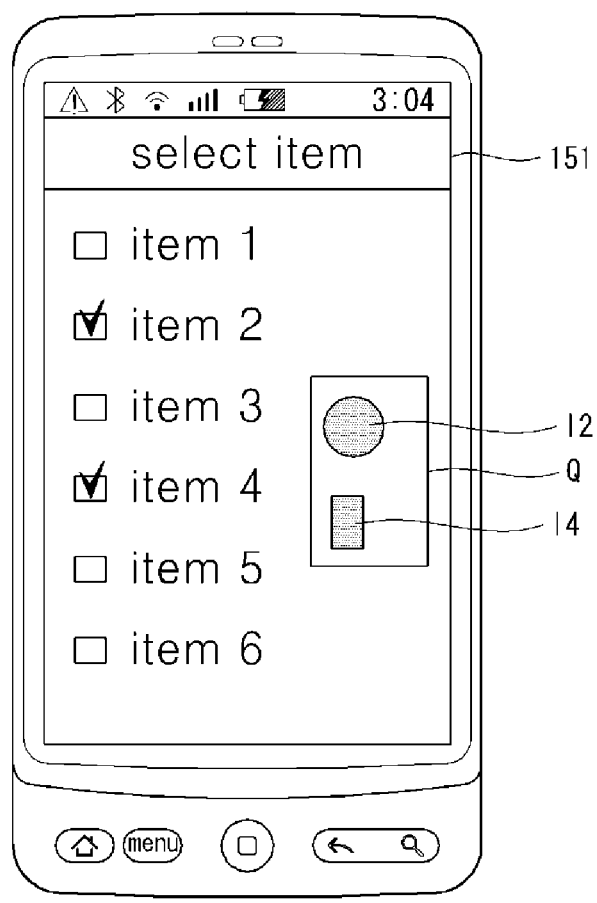
FIGS. 38 and 39 illustrate another operation of the mobile terminal shown in FIG. 19.
Figure 39:
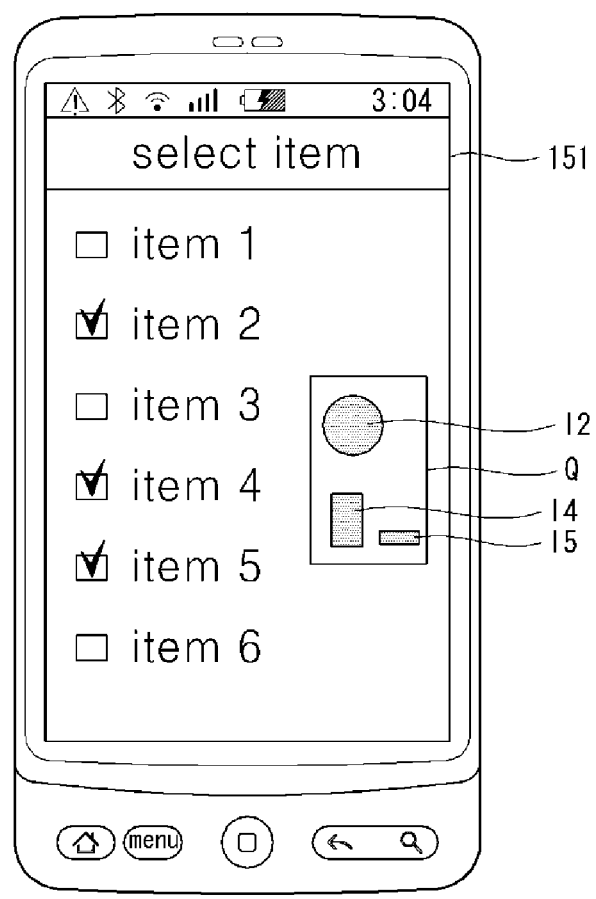

FIGS. 38 and 39 illustrate another operation of the mobile terminal of FIG. 19.

As shown in FIGS. 38 and 39, the mobile terminal 100 according to an embodiment of the present invention can select items from a list displayed on the display 151 and arrange the selected items on a wallpaper W. Here, the items selected by the user can be immediately displayed on a preview screen Q to improve user convenience.

Referring to FIG. 38, the user can select second and fourth items. Upon select of the second and fourth items by the user, a preview screen Q can display second and fourth icons I2 and I4 corresponding to the second and fourth items.

Referring to FIG. 39, the user can additionally select a fifth item. Upon selection of the fifth item by the user, the preview screen Q can additionally display a fifth icon I5 corresponding to the fifth item. That is, since an icon corresponding to an item selected by the user is displayed in real time, the user can check the form of the selected item.

In the above-described embodiments, one of a wallpaper and a preview screen has been exemplified. However, since the wallpaper and the preview screen correspond to each other, manipulation of one of the wallpaper and the preview screen is reflected in the other, as described above. Accordingly, description of one of the wallpaper and the preview screen can be equally applied to the other.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a touchscreen;
   a controller configured to:
      receive a touch input via the touchscreen,
      in response to the touch input, control the mobile terminal to enter into a move mode and move at least one icon of a first wallpaper of a plurality of wallpapers within the first wallpaper or to another wallpaper of the plurality of wallpapers, and
      display, on the touchscreen, a plurality of preview screens corresponding to the plurality of wallpapers and the first wallpaper,
      wherein the plurality of preview screens discloses an arrangement state of the at least one icon in the plurality of wallpapers,
      wherein the controller is further configured to receive a drag and drop input for moving the at least one icon to a second preview screen of the plurality of preview screens, and to move the at least one icon to a second wallpaper corresponding to the second preview screen, when the drag and drop input is released.

2. The mobile terminal of claim 1, wherein the plurality of preview screens include a first preview screen corresponding to the first wallpaper.

3. The mobile terminal of claim 1, wherein the touch input is a long touch input.

4. The mobile terminal of claim 1, wherein when the at least one icon is touch and moved, the controller is configured to display a movement of the at least one icon displayed on a preview screen.

5. The mobile terminal of claim 1, wherein when the at least one icon is manipulated, the controller is configured to reflect manipulation of the at least one icon in a first preview icon displayed on a first preview screen, wherein the first preview icon corresponds to the at least one icon displayed on the first wallpaper.

6. The mobile terminal of claim 1, wherein at least one of the preview screens discloses a shape of the at least one icon displayed on the first wallpaper.

7. The mobile terminal of claim 1, wherein at least one of the preview screens has a smaller size than a reduced screen of the first wallpaper.

8. A mobile terminal comprising:
   a touchscreen configured to display a first wallpaper of a plurality of wallpapers; and
   a controller configured to:
      receive a touch input on the first wallpaper,
      in response to the touch input, display a reduced first wallpaper corresponding to the first wallpaper including a first icon and a plurality of preview screens corresponding to the plurality of wallpapers, and
      re-arrange the first icon within the reduced first wallpaper or to another reduced wallpaper,
      wherein the plurality of preview screens disclose an arrangement state of the first icon in the reduced first wallpaper or the another reduced wallpaper,
      wherein the controller is further configured to receive a drag and drop input for moving the first icon to a second preview screen of the plurality of preview screens, and to move the first icon to a second wallpaper corresponding to the second preview screen, when the drag and drop input is released.

9. The mobile terminal of claim 8, wherein the plurality of preview screens include a first preview screen corresponding to the first wallpaper.

10. The mobile terminal of claim 8, wherein when the first icon is touch and moved, the controller is configured to display a movement of the first icon displayed on a preview screen.

11. The mobile terminal of claim 8, wherein when the first icon is manipulated, the controller is configured to reflect manipulation of the first icon in a first preview icon displayed on a first preview screen, wherein the first preview icon corresponds to the first icon displayed on the first wallpaper.

12. The mobile terminal of claim 8, wherein at least one of the preview screens discloses a shape of the first icon displayed on the first wallpaper.

13. The mobile terminal of claim 8, wherein at least one of the preview screens has a smaller size than a reduced screen of the reduced first wallpaper.

14. A mobile terminal comprising:
a touchscreen configured to display a first wallpaper of a plurality of wallpapers including at least one icon; and
a controller configured to:
receive a touch input on a first icon displayed on the first wallpaper,
display, on the touchscreen, a plurality of preview screens corresponding to the plurality of wallpapers and the first wallpaper, and
move the first icon within the first wallpaper or to another wallpaper of the plurality of wallpapers,
wherein the plurality of preview screens disclose an arrangement state of the first icon and at least one icon in the first wallpaper or the another wallpaper,
wherein the controller is further configured to receive a drag and drop input for moving the first icon to a second preview screen of the plurality of preview screens, and to move the first icon to a second wallpaper corresponding to the second preview screen, when the drag and drop input is released.

15. The mobile terminal of claim 14, wherein the plurality of preview screens include a first preview screen corresponding to the first wallpaper.

16. The mobile terminal of claim 14, wherein the touch input is a long touch input.

17. The mobile terminal of claim 14, wherein when the first icon is touch and moved, the controller is configured to display a movement of the first icon displayed on a preview screen.

18. The mobile terminal of claim 14, wherein when the first icon is manipulated, the controller is configured to reflect manipulation of the first icon in a first preview icon displayed on a first preview screen, wherein the first preview icon corresponds to the first icon displayed on the first wallpaper.

19. The mobile terminal of claim 14, wherein at least one of the preview screens discloses a shape of the first icon displayed on the first wallpaper.

20. The mobile terminal of claim 14, wherein at least one of the preview screens has a smaller size than a reduced screen of the first wallpaper.

21. A method of controlling a mobile terminal comprising:
displaying, on a touchscreen, a first wallpaper of a plurality of wallpapers;
receiving a touch input on a first icon displayed on the first wallpaper;
displaying, on the touchscreen, a plurality of preview screens corresponding to the plurality of wallpapers and the first wallpaper;
moving the first icon within the first wallpaper to another wallpaper of the plurality of wallpapers,
wherein the plurality of preview screens disclose an arrangement state of the first icon and at least one icon in the first wallpaper or the another wallpaper,
receiving a drag and drop input for moving the first icon to a second preview screen of the plurality of preview screens; and
moving the first icon to a second wallpaper corresponding to the second preview screen, when the drag and drop input is released.

22. The method of claim 21, wherein the plurality of preview screens include a first preview screen corresponding to the first wallpaper.

23. The method of claim 21, wherein the touch input on the first icon is a long touch input.

24. The method of claim 21, wherein when the first icon is touch and moved, the method comprises displaying a movement of the first icon displayed on a preview screen.

25. The method of claim 21, wherein when the first icon is manipulated, the method comprises reflecting manipulation of the first icon in a first preview icon displayed on a first preview screen, wherein the first preview icon corresponds to the first icon displayed on the first wallpaper.

26. The method of claim 21, wherein at least one of the preview screens discloses a shape of the first icon displayed on the first wallpaper.

27. The method of claim 21, wherein at least one of the preview screens has a smaller size than a reduced screen of the first wallpaper.

* * * * *